United States Patent
Cheng et al.

(10) Patent No.: US 7,752,383 B2
(45) Date of Patent: Jul. 6, 2010

(54) NAND FLASH MEMORY SYSTEM WITH PROGRAMMABLE CONNECTIONS BETWEEN A NAND FLASH MEMORY CONTROLLER AND A PLURALITY OF NAND FLASH MEMORY MODULES AND METHOD THEREOF

(75) Inventors: Chuang Cheng, Hsinchu (TW); Ching-Chang Chen, Hsinchu (TW); Satoshi Sugawa, Hsinchu (TW); Wen-Lin Chang, Hsinchu (TW); Kai-Hsun Lin, Hsinchu (TW); Fuja Shone, Hsinchu (TW)

(73) Assignee: Skymedi Corporation, Science Park, Hsinchu (TW)

( * ) Notice: Subject to any disclaimer, the term of this patent is extended or adjusted under 35 U.S.C. 154(b) by 469 days.

(21) Appl. No.: 11/753,572

(22) Filed: May 25, 2007

(65) Prior Publication Data

US 2008/0294836 A1 Nov. 27, 2008

(51) Int. Cl.
*G06F 12/00* (2006.01)

(52) U.S. Cl. .................................................. 711/103
(58) Field of Classification Search ............... None
See application file for complete search history.

(56) References Cited

U.S. PATENT DOCUMENTS

| 5,530,673 | A | * | 6/1996 | Tobita et al. | 365/185.09 |
| 5,608,673 | A | * | 3/1997 | Rhee | 365/185.33 |
| 6,684,290 | B2 | * | 1/2004 | Katahira | 711/103 |
| 2005/0268208 | A1 | * | 12/2005 | Shimizume et al. | 714/763 |

* cited by examiner

*Primary Examiner*—Brian R Peugh
(74) *Attorney, Agent, or Firm*—Winston Hsu

(57) ABSTRACT

A method and related system for programming connections between a NAND flash memory controller and a plurality of NAND flash memory modules includes the NAND flash memory controller generating a switch signal and a swap signal according to a condition of one of the plurality of NAND flash memory modules, a remap module selectively coupling the plurality of NAND flash memory modules to the NAND flash memory controller according to the switch signal, and a swap module selectively coupling the plurality of NAND flash memory modules to the NAND flash memory controller according to the swap signal.

61 Claims, 19 Drawing Sheets

NAND FLASH MEMORY SYSTEM WITH PROGRAMMABLE CONNECTIONS BETWEEN A NAND FLASH MEMORY CONTROLLER AND A PLURALITY OF NAND FLASH MEMORY MODULES AND METHOD THEREOF

BACKGROUND OF THE INVENTION

1. Field of the Invention

The present invention provides a NAND flash memory system, and more particularly, a NAND flash memory system with programmable connections between a NAND flash memory controller and a plurality of NAND flash memory modules.

2. Description of the Prior Art

Please refer to FIG. 1. FIG. 1 is a diagram illustrating a conventional single channel NAND flash memory system 100. The conventional single channel NAND flash memory system 100 comprises a NAND flash memory controller 110 and a NAND flash memory module M1. The NAND flash memory controller 110 comprises a data interface 111, an action control interface 112, a chip enable interface 113, and a status interface 114. The NAND flash memory module M1 comprises a data interface M11, an action control interface M12, a chip enable interface M13, and a status interface M14.

The data interface 111 of the NAND flash memory controller 110 comprises 2 8-bit data ports D1 and D2. M11 is coupled to the data interface 111 through the port D1 for exchanging data with the NAND flash controller 110 so that a data with 8-bit data width is transmitted between the NAND flash memory controller 110 and the NAND flash memory modules M1. It is assumed that a single channel NAND flash memory system is defined by the data width and here we define a single channel NAND flash memory system with an 8-bit data width.

The action control interface 112 comprises 2 action control ports AC1 and AC2. The action control interface 112 is coupled to the action control interfaces M12 through the port AC1 for transmitting action control signals to the NAND flash memory module M1. The action control signals control the actions of the NAND flash memory modules M1.

The chip enable interface 113 comprises 4 chip enable ports CE1, CE2, CE3, and CE4. The chip enable interface 113 is coupled to the chip enable interface M13 through port CE1 for transmitting chip enable signals to the NAND flash memory module M1. For example, if the chip enable interface 113 transmits a chip enable signal to the chip enable interface M13 of the NAND flash memory module M1 through the port CE1, then the NAND flash memory module M1 is enabled to execute corresponding actions according to the action control signals.

The status interface 114 comprises 2 status ports RB1 and RB2. The status interface 114 is coupled to the status interfaces M14 through port RB1 for receiving status signals from the NAND flash memory modules M1. For example, if the NAND flash memory module M1 is busy, the NAND flash memory module M1 transmits a busy signal to the status interface 114 through the port RB1, then the controller 110 can know the NAND flash memory module M1 is busy and stops the following actions until the NAND flash memory module M1 is ready. Therefore, for example, if the NAND flash memory controller 110 is about to write data to the NAND flash memory module M1, the NAND flash memory controller 110 checks if the NAND flash memory module M1 is ready through the port RB1 of the status interface 114. If yes, the NAND flash memory controller 110 transmits a chip enable signal to the chip enable interface M13 of the NAND flash memory module M1 through the port CE1 of the chip enable interface 113 to enable the NAND flash memory module M1, transmits a write action and address to the NAND flash memory module M1 through the action control interface 112 and data interface 111, transmits the data to the NAND flash memory module M1 through the data interface 111, transmits a write confirm action to the NAND flash memory module M1 through the action control interface 112 and data interface 111. Then, the data is written into the NAND flash memory module M1.

In NAND flash memory system 100, the total density of the NAND flash memory system is equal to the density of NAND flash memory M1, that is, if the size of a NAND flash memory M1 is 1 MB, the total density of the NAND flash memory system is 1 MB.

Please refer to FIG. 2. FIG. 2 is a diagram illustrating another single-channel NAND flash memory system 200. The single-channel NAND flash memory system 200 is an expansion of the single-channel NAND flash memory system 100 illustrated in FIG. 1. The single channel NAND flash memory system 200 comprises a NAND flash memory controller 110 and 4 NAND flash memory modules M2-M5. The NAND flash memory modules M2-M5 are the same as the NAND flash memory module M1. Thus, the total density is 4 MB if the density of a NAND flash memory is 1 MB.

In NAND flash memory system 200, the chip enable interface 113 is respectively coupled to the chip enable interface M23, M33, M43, and M53 through ports CE1, CE2, CE3, and CE4 for respectively transmitting chip enable signals to the NAND flash memory modules M2-M5. For example, if the chip enable interface 113 transmits a chip enable signal to the chip enable interface M23 of the NAND flash memory module M2 through the port CE1, then the NAND flash memory module M2 is enabled to occupy the data bus coupled to the data interface 111 of the NAND flash controller 110 and execute corresponding actions according to the action control signals.

The status interface of each NAND flash memory modules M24, M34, M44 and M54 are conjointly coupled to the status interface 114 through the port RB1. In this way, as long as any of the NAND flash memory modules M2-M5 is busy, the NAND flash memory controller 110 considers all the NAND flash memory modules M2-M5 are busy and halts the related action. The related action is not continued until all the NAND flash memory modules M2 to M5 are ready. Therefore, for example, if the NAND flash memory controller 110 is about to write data to the NAND flash memory module M2, the NAND flash memory controller 110 checks if NAND flash memories M2 is ready through the port RB1 of the status interface 114. If yes, the NAND flash memory controller 110 transmits a chip enable signal to the chip enable interface M23 of the NAND flash memory module M2 through the port CE1 of the chip enable interface 113 to enable the NAND flash memory module M2, transmits write action and address to the NAND flash memory module M2 through the action control interface 112 and data interface 111, transmits the data to the NAND flash memory module M2 through the data interface 111, transmits a write confirm action to the NAND flash memory module M2 through the action control interface 112 and data interface 111. Then, the data is written into the NAND flash memory module M2.

Please continue referring to FIG. 2. The drawback of the single channel NAND flash memory system 200 is that the NAND flash memory controller 110 is not flexible to control the NAND flash memory modules M2-M5 especially when any of the NAND flash memory modules M2-M5 is dead.

For example, if the NAND flash memory module M2 is dead the NAND flash memory controller 110 still writes data to the NAND flash memory module M2 so that the written data is not stored in the NAND flash memory module M2. Thus, when the NAND flash memory controller 110 is about to read the written data stored in the NAND flash memory module M2, the NAND flash memory controller 110 reads a wrong data or nothing. There are still 3 NAND flash memory modules M3-M5 active, that is, if the size of a NAND flash memory module is 1 MB, there are still 3 MB memories available. But due to the inflexibility of the controller 110, the conventional single channel NAND flash memory system 200 does not work and the available 3 MB NAND flash memory modules are wasted.

Please refer to FIG. 3. FIG. 3 is a diagram illustrating a conventional dual channel NAND flash memory system 300. The conventional dual channel NAND flash memory system 300 comprises a NAND flash memory controller 110 and 2 NAND flash memory modules M6 and M7. The NAND flash memory modules M6 and M7 are the same as the NAND flash memory module M1.

The data interface 111 is respectively coupled to the data interfaces M61 and M71 through the ports D1 and D2 for exchanging data with the NAND flash memory modules M6 and M7. Generally, the ports D1 and D2 are both 8-bit data port, and each data interface of the NAND flash memory modules M6 and M7 has an 8-bit data port as well. The system 300 is named as "dual channel" because the data ports of the NAND flash memory modules M6 and M7 are coupled to the different data port of the data interface 111 so that a data with doubled 8-bit data width is transmitted between the NAND flash memory controller 110 and the NAND flash memory modules M6 and M7. It is assumed that a dual channel NAND flash memory system is defined by the data width instead of the amount of the NAND flash memory modules and here we define a dual channel NAND flash memory system with a doubled 8-bit data width. Thus, the amount of the NAND flash memory modules of a dual channel NAND flash memory system can be any number and does not have to be 2.

The action control interface 112 is respectively coupled to the action control interfaces M62 and M72 through ports AC1 and AC2 for transmitting action control signals to the NAND flash memory modules M6 and M7.

The chip enable interface 113 is conjointly coupled to the chip enable interface M63 and M73 for transmitting chip enable signals to the NAND flash memory modules M6 and M7. Thus, if the chip enable interface 113 transmits a chip enable signal through the port CE1, then the NAND flash memory modules M6 and M7 are both enabled to execute corresponding actions according to the action control signals.

The status interface 114 is respectively coupled to the status interfaces M64 and M74 through ports RB1 and RB2 for respectively receiving status signals from the NAND flash memory modules M6 and M7. Thus, if the NAND flash memory module M6 is busy, the NAND flash memory module M6 transmits a busy signal to the status interface 114 through the port RB1, then the controller 110 can know the NAND flash memory module M6 is busy and stops the following actions until the NAND flash memory module M6 is ready. Therefore, for example, if the NAND flash memory controller 110 is about to write data to the NAND flash memory module M6, the NAND flash memory controller 110 checks if the NAND flash memory modules M6 is ready through the ports RB1 of the status interface 114. If yes, the NAND flash memory controller 110 transmits a chip enable signal to enable the NAND flash memory modules M6, transmits write action and address to the NAND flash memory module M6 through the action control interface 112 and data interface 111, transmits the data to the NAND flash memory module M6 through the data interface 111, transmits a write confirm action to the NAND flash memory module M6 through the action control interface 112 and data interface 111. Then, the data is written into the NAND flash memory module M6.

Please refer to FIG. 3. The drawback of the conventional dual channel NAND flash memory system 300 is that the NAND flash memory controller 110 is not flexible to control the NAND flash memory modules M6 and M7 when M6 is dead.

For example, if M7 is dead, the NAND flash memory system can still work like a single NAND flash memory system 100 shown in FIG. 1. However, if the NAND flash memory module M6 is dead, the NAND flash memory system can't work like a single NAND flash memory system 100 because all the signals of the NAND flash controller 110 are coupled to M7 through the second ports of the interfaces such as D2, AC2, RB2. In the case, there are still 1 NAND flash memory module active, that is, if the size of a NAND flash memory module is 1 MB, there are still 1 MB memories available. But due to the inflexibility of the controller, the conventional dual-channel NAND flash memory system 300 does not work and the available 1 MB NAND flash memory modules are wasted.

Please refer to FIG. 4. FIG. 4 is a diagram illustrating another conventional dual channel NAND flash memory system 400. The NAND flash memory system 400 comprises a NAND flash memory controller 110 and 2 NAND flash memory modules M8 and M9. The NAND flash memory modules M8 and M9 are the same as the NAND flash memory module M1. In the NAND flash memory system 400, the action control interface 112 is coupled to the action control interfaces M82 and M92. And the status interfaces M84 and M94 are conjointly coupled to the status interface 114.

Please refer to FIG. 5. FIG. 5 is a diagram illustrating another dual channel NAND flash memory system 500. The NAND flash memory system 500 is an expansion of NAND flash memory system 300 shown in FIG. 3. The NAND flash memory system 500 comprises a NAND flash memory controller 110 and 4 identical NAND flash memory modules MA-MD. The NAND flash memory modules MA-MD are the same as the NAND flash memory module M1. Thus, the total density is 4 MB and the density of a NAND flash memory is 1 MB.

In NAND flash memory system( 500, the chip enable interface 113 is respectively coupled to the chip enable interfaces MA3, MB3, MC3, and MD3 through the ports CE1, CE2, CE1 and CE2. Thus, if the chip enable interface 113 transmits a chip enable signal to the chip enable interface MA3 and MC3 through the port CE1, then the NAND flash memory module MA and MC are enabled to execute corresponding actions according to the action control signals.

The status interface of NAND flash memory module MA4 and MB4 are conjointly coupled to the status interface 114 through the port RB1. And the status interface of NAND flash memory module MC4 and MD4 are conjointly coupled to the status interface 114 through the port RB2. Thus, if the NAND flash memory controller 110 is about to write data to the NAND flash memory module MA, the NAND flash memory controller 110 checks if the NAND flash memories MA is ready through the port RB1 of the status interface 114. If yes, the NAND flash memory controller 110 transmits a chip enable signal to the chip enable interface MA3 of the NAND flash memory module MA through the port CE1 of the chip enable interface 113 to enable the NAND flash memory module MA, transmits write action and address to the NAND flash memory module MA through the action control interface 112 and data interface 111, transmits the data to the NAND flash memory module MA through the data interface 111, transmits a write confirm action to the NAND flash memory module MA through the action control interface 112 and data interface 111. Then, the data is written into the NAND flash memory module MA.

SUMMARY OF THE INVENTION

The present invention provides a single channel NAND flash memory system. The system comprising a NAND flash memory controller comprising a data interface for exchanging data; a switch interface for transmitting a switch signal; an action control interface for transmitting an action control signal; a chip enable interface for transmitting chip enable signals, the chip enable interface comprising a plurality of ports, each port transmitting a corresponding chip enable signal; and a status interface for receiving status signal; a plurality of flash memory modules, each NAND flash memory module comprising a data interface coupled to the data interface of the NAND flash memory controller for exchanging data; an action control interface coupled to the action control interface of the NAND flash memory controller for the action control signal; a chip enable interface for the chip enable signal; and a status interface for transmitting the corresponding status signal; a remap module comprising a control port coupled to the switch interface for receiving the switch signal; a plurality of first ports, each of the first ports coupled to the corresponding port of the chip enable interface of the NAND flash memory controller; and a plurality of second ports, each of the second ports coupled to the chip enable interface of the corresponding NAND flash memory module and selectively coupled to one of the first ports according to the switch signal.

The present invention further provides a dual channel NAND flash memory system. The system comprising a NAND flash memory controller comprising a data interface for exchanging data, the data interface comprising two data ports; a swap interface for transmitting a swap signal; an chip enable interface for transmitting a chip enable signal; an action control interface for transmitting action control signals, the action control interface comprising two ports, each port transmitting a corresponding action control signal; and a status interface for receiving status signals, the status interface comprising two ports, each port receiving a corresponding status signal; a first NAND flash memory module comprising a data interface for exchanging data; a chip enable interface coupled to the chip enable interface of the NAND flash memory controller for receiving the chip enable signal; an action control interface for receiving the corresponding action control signal; and a status interface for transmitting the corresponding status signal; a second NAND flash memory module comprising a data interface for exchanging data; a chip enable interface coupled to the chip enable interface of the NAND flash memory controller for receiving the chip enable signal; an action control interface for receiving the corresponding action control signal; and a status interface for transmitting the corresponding status signal; a first swap module comprising a control port coupled to the swap interface for receiving the swap signal; two first ports, each of the first ports coupled to the corresponding port of the action control interface of the NAND flash memory controller; and two second ports, each of the second ports coupled to the action interface of the corresponding NAND flash memory module and selectively coupled to one of the first ports according to the swap signal; a second swap module comprising a control port coupled to the swap interface for receiving the swap signal; two first ports, each of the first ports coupled to the corresponding port of the status interface of the NAND flash memory controller; and two second ports, each of the second ports coupled to the status interface of the corresponding NAND flash memory module and selectively coupled to one of the first ports according to the swap signal; and a third swap module comprising a control port coupled to the swap interface for receiving the swap signal; two first ports, each of the first ports coupled to the corresponding port of the data interface of the NAND flash memory controller; and two second ports, each of the second ports coupled to the data interface of the corresponding NAND flash memory module and selectively coupled to one of the first ports according to the swap signal.

The present invention further provides a dual channel NAND flash memory system. The system comprising a NAND flash memory controller comprising a data interface for exchanging data, the data interface comprising two data ports; a swap interface for transmitting a swap signal; an chip enable interface for transmitting a chip enable signal; an action control interface for transmitting action control signals; and a status interface for receiving status signals; a first NAND flash memory module comprising a data interface for exchanging data; a chip enable interface coupled to the chip enable interface of the NAND flash memory controller for receiving the chip enable signal; an action control interface coupled to the action control interface of the NAND flash memory controller for receiving the corresponding action control signal; and a status interface coupled to the status interface of the NAND flash memory controller for transmitting the corresponding status signal; a second NAND flash memory module comprising a data interface for exchanging data; a chip enable interface coupled to the chip enable interface of the NAND flash memory controller for receiving the chip enable signal; an action control interface coupled to the action control interface of the NAND flash memory controller for receiving the corresponding action control signal; and a status interface coupled to the status interface of the NAND flash memory controller for transmitting the corresponding status signal; a swap module comprising a control port coupled to the swap interface for receiving the swap signal; two first ports, each of the first ports coupled to the corresponding port of the data interface of the NAND flash memory controller; and two second ports, each of the second ports coupled to the data interface of the corresponding NAND flash memory module and selectively coupled to one of the first ports according to the swap signal.

The present invention further provides a dual channel NAND flash memory system. The system comprising a NAND flash memory controller comprising a data interface for exchanging data, the data interface comprising two data ports; a swap interface for transmitting a swap signal; a switch interface for transmitting a switch signal; an chip enable interface for transmitting chip enable signals; an action control interface for transmitting action control signals, the action control interface comprising two ports, each port transmitting a corresponding action control signal; and a status interface for receiving status signals, the status interface comprising two ports, each port receiving a corresponding status signal; four NAND flash memory modules, each NAND flash memory module comprising a data interface for exchanging data; a chip enable interface for receiving the chip enable signal; an action control interface for receiving the corresponding action control signal; and a status interface for transmitting the corresponding status signal; a first swap module comprising a control port coupled to the swap interface for receiving the swap signal; two first ports, each of the first ports coupled to the corresponding port of the action control interface of the NAND flash memory controller; and two second ports, each of the second ports coupled to the action interfaces of the corresponding NAND flash memory modules and selectively coupled to one of the first ports according to the swap signal; a second swap module comprising a control port coupled to the swap interface for receiving the swap signal; two first ports, each of the first ports coupled to the corresponding port of the status interface of the NAND flash memory controller; and two second ports, each of the second ports coupled to the status interfaces of the corresponding NAND flash memory modules and selectively coupled to one of the first ports according to the swap signal; and a third swap module comprising a control port coupled to the swap interface for receiving the swap signal; two first ports, each of the first ports coupled to the corresponding port of the data interface of the NAND flash memory controller; and two second ports, each of the second ports coupled to the data interfaces of the corresponding NAND flash memory module and selectively coupled to one of the first ports according to the swap signal; and a remap module comprising a control port coupled to the switch interface for receiving the switch signal; a plurality of first ports, each of the first ports coupled to the corresponding port of the chip enable interface of the NAND flash memory controller; and a plurality of second ports, each of the second ports coupled to the chip enable interfaces of the corresponding NAND flash memory module and selectively coupled to one of the first ports according to the switch signal.

The present invention further provides a NAND flash memory system. The NAND flash memory system comprises a NAND flash memory controller comprising a data interface for exchanging data, a swap interface for transmitting swap signals, a switch interface for transmitting switch signals, an chip enable interface for transmitting at least one chip enable signal, an action control interface for transmitting at least one action control signal, and a status interface for receiving at least one status signal, at least one NAND flash memory module, each NAND flash memory module comprising a data interface for exchanging data, a chip enable interface for receiving a corresponding chip enable signal transmitted from the chip enable interface of the NAND flash memory controller, an action control interface for receiving a corresponding action control signal transmitted from the action control interface of the NAND flash memory controller, and a status interface for transmitting a corresponding status signal, and an universal connection device coupled between the NAND flash memory controller and the NAND flash memory modules for coupling the NAND flash memory controller to the NAND flash memory modules according to the swap signals and switch signals.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
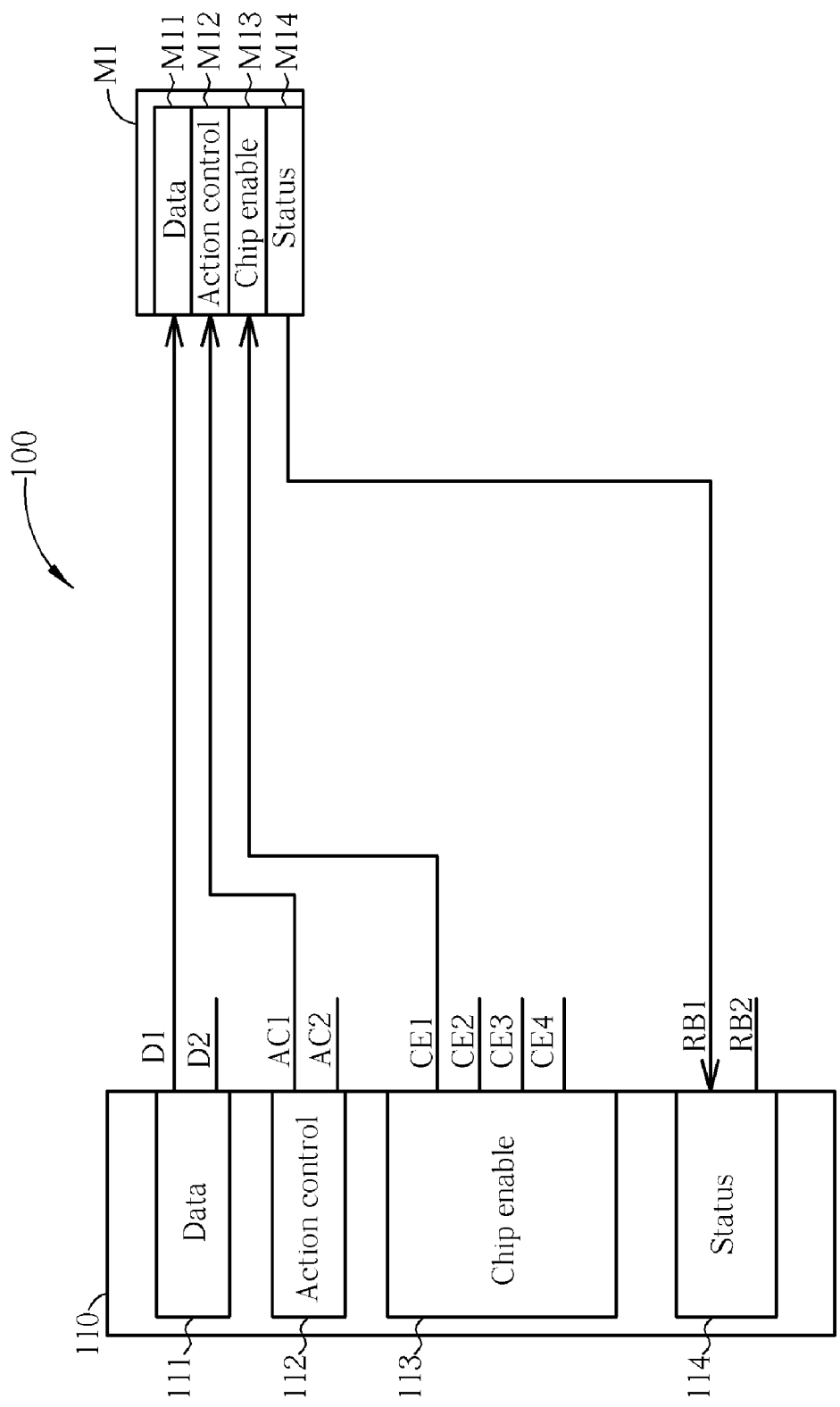
FIG. 1 is a diagram illustrating a conventional single channel NAND flash memory system.
Figure 2:
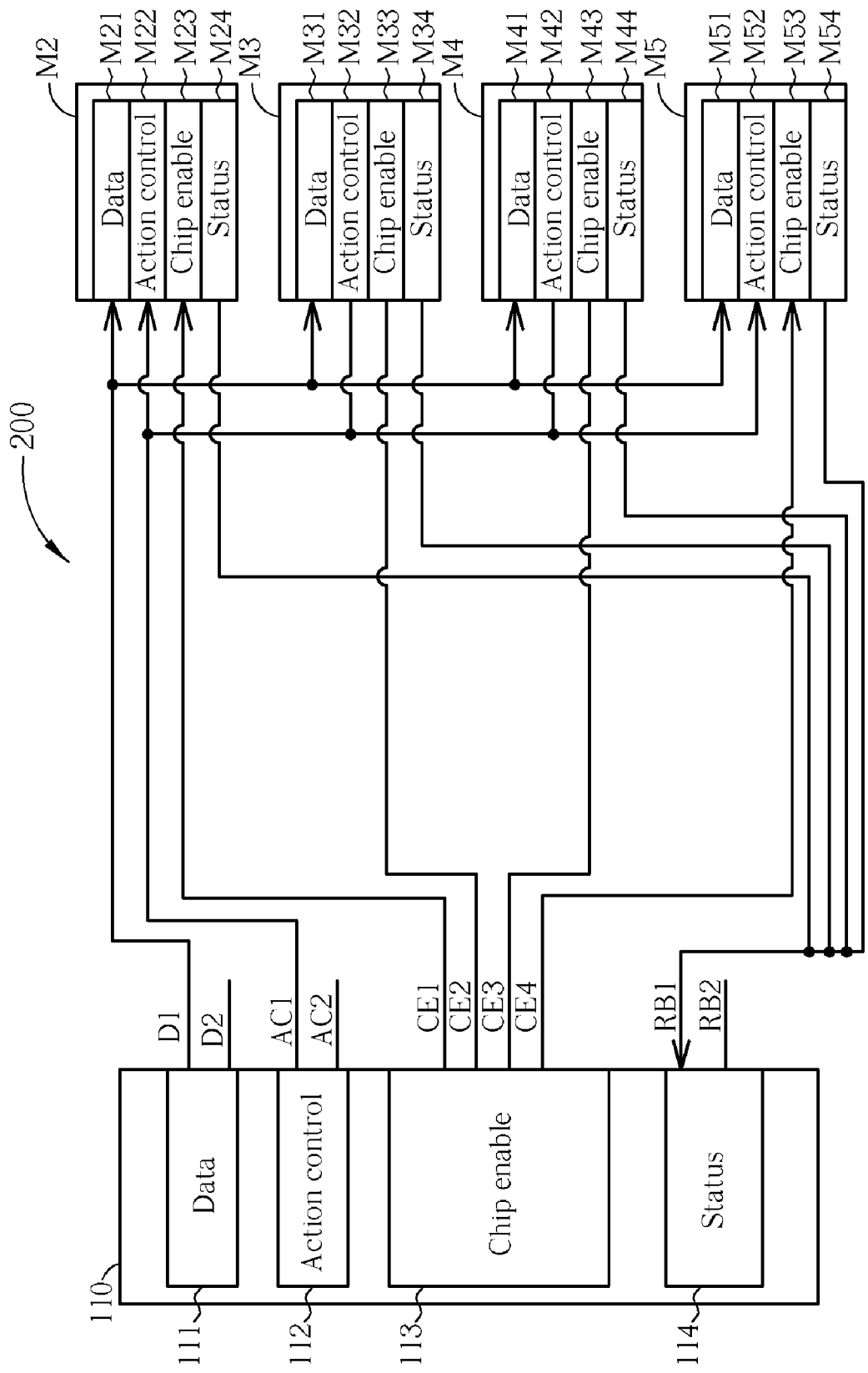
FIG. 2 is a diagram illustrating a conventional single channel NAND flash memory system with increased density.
Figure 3:
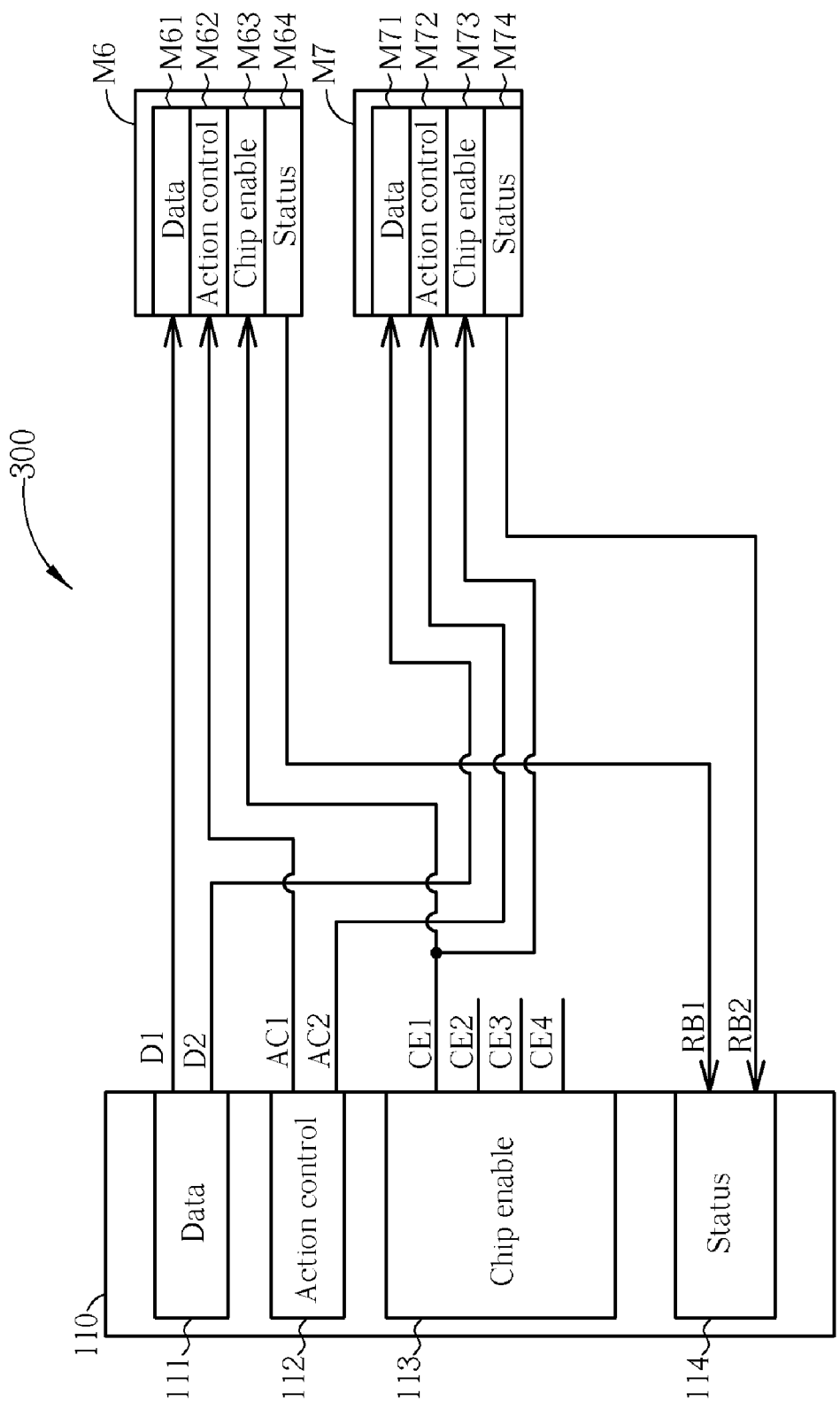
FIG. 3 is a diagram illustrating a conventional dual channel NAND flash memory system.
Figure 4:
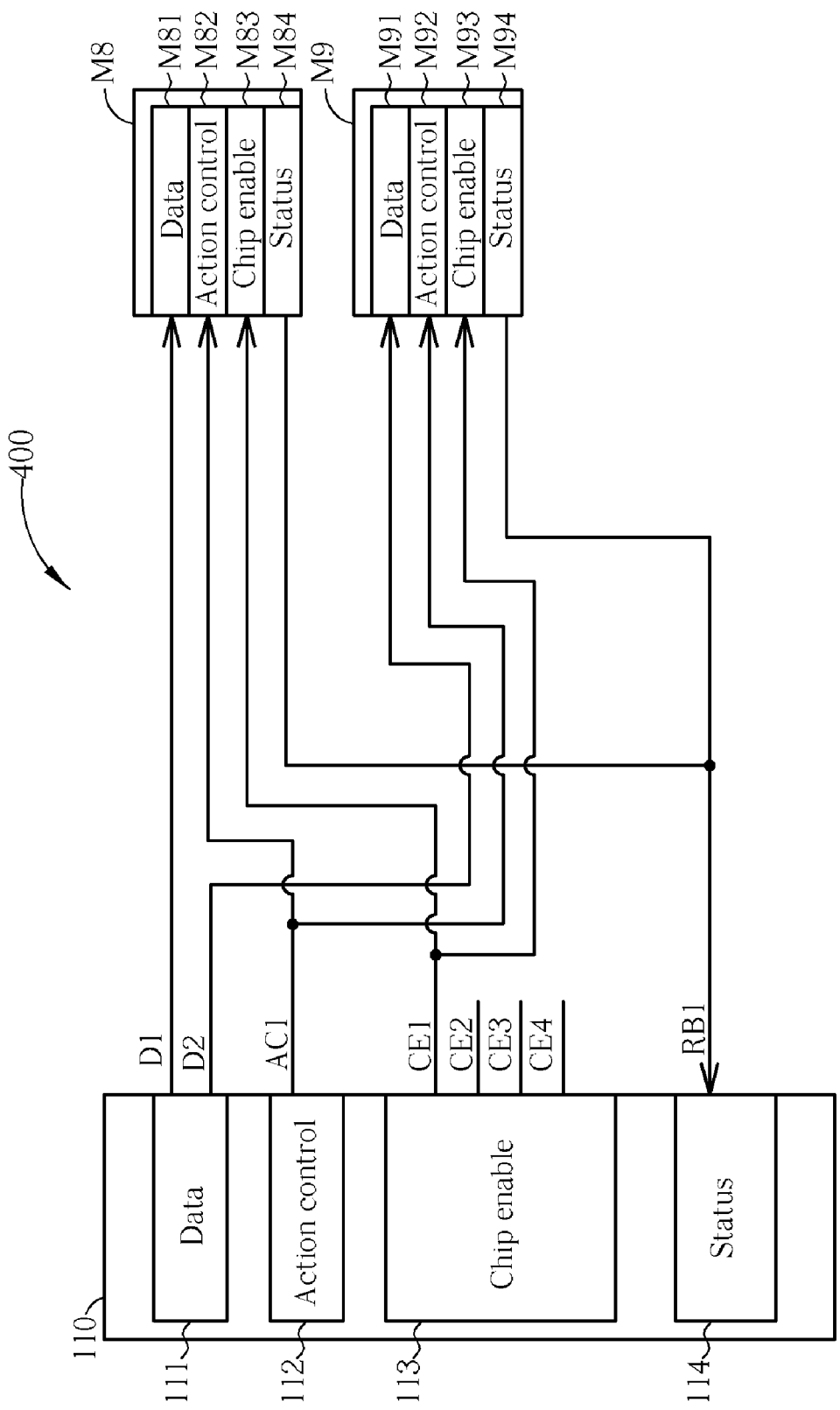
FIG. 4 is a diagram illustrating a conventional dual channel NAND flash memory system.
Figure 5:
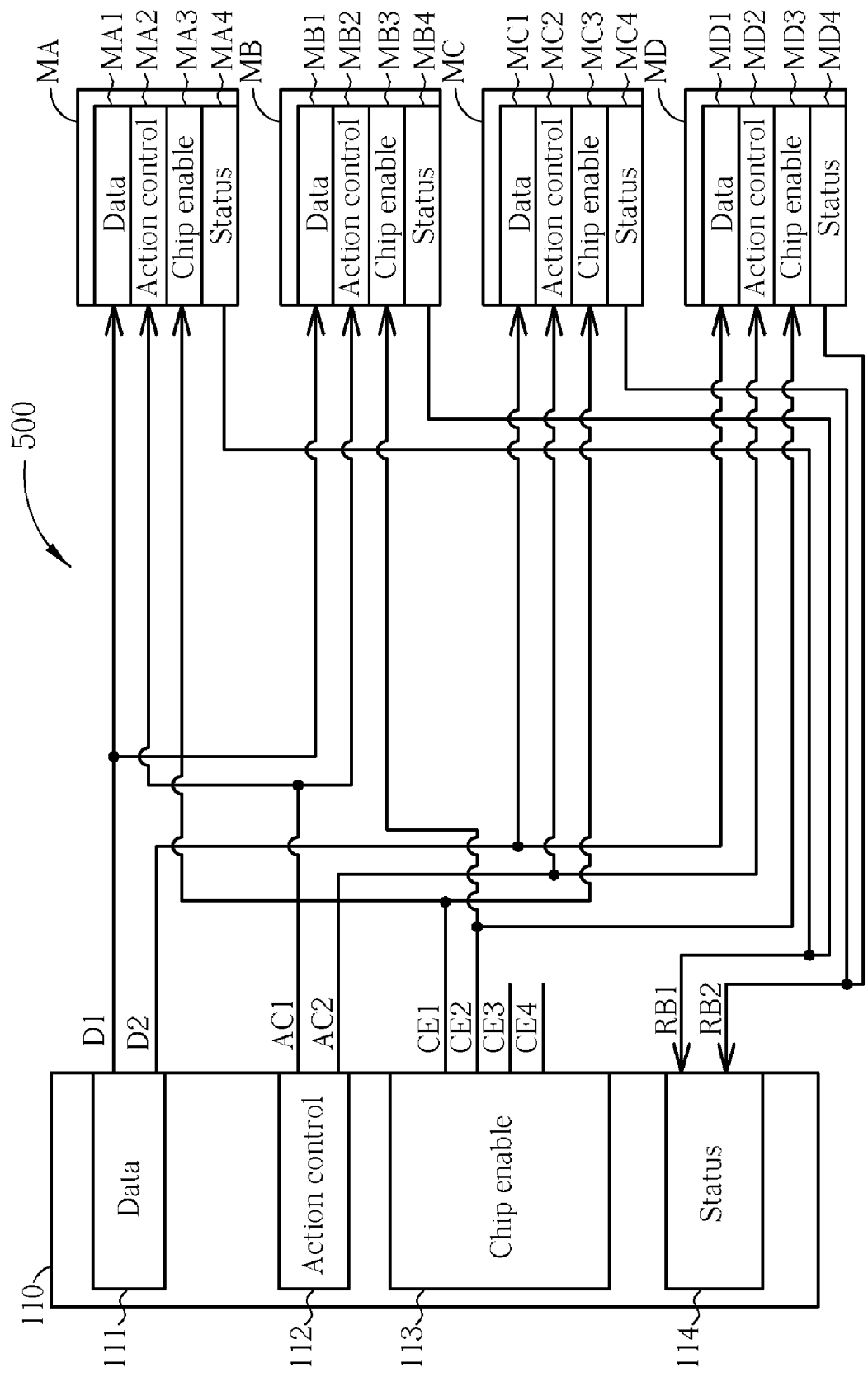
FIG. 5 is a diagram illustrating a conventional dual channel NAND flash memory system with increased density.
Figure 6:
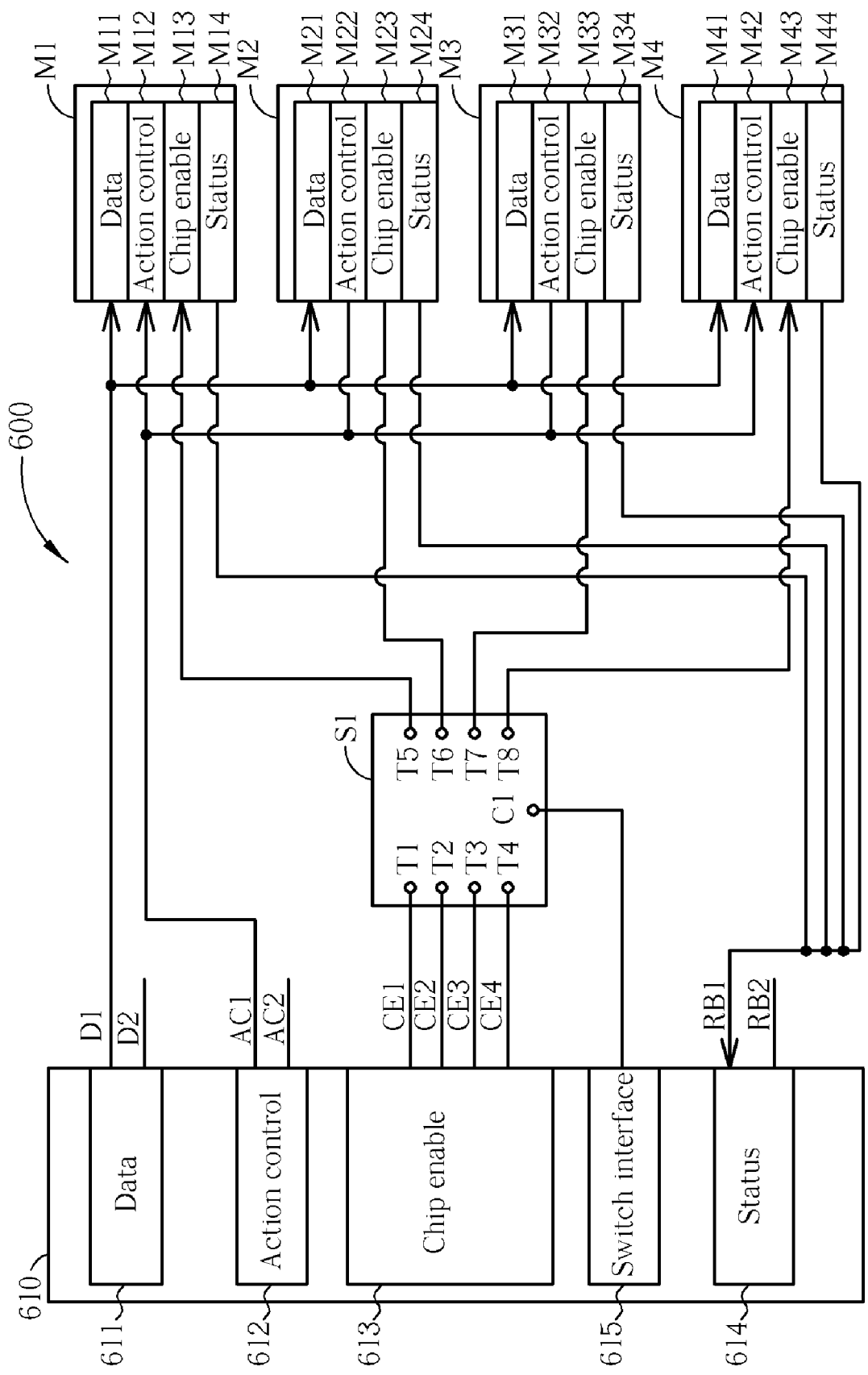
FIG. 6 is a diagram illustrating a single channel NAND flash memory system of the first embodiment of the present invention.

Please refer to FIG. 6. FIG. 6 is a diagram illustrating a single channel NAND flash memory system 600 of a first embodiment of the present invention. The single channel NAND flash memory system 600 of the present invention comprises a NAND flash memory controller 610, 4 NAND flash memory modules M1-M4, and 1 remap modules S1. The NAND flash memory controller 610 comprises a data interface 611, an action control interface 612, a chip enable interface 613, a status interface 614, and a switch interface 615.

The data interface 611 is conjointly coupled to the data interfaces M11, M21, M31, and M41 for exchanging data with the NAND flash memory modules M1-M4. The data interface 611 has an 8-bit data port, and each data interface of the NAND flash memory modules M1-M4 has an 8-bit data port as well. All the data ports of the NAND flash memory modules are coupled to the same data port of the data interface 611 for exchanging data with 8-bit data width.

The action control interface 612 is conjointly coupled to the action control interfaces M12, M22, M32, and M42 for transmitting action control signals to the NAND flash memory modules M1-M4. The action control signals control the actions of the NAND flash memory modules M1-M4.

The switch interface 615 is coupled to the control ports Cl of the remap modules S1 1 for transmitting switch signals to the remap modules S1 and controlling the internal physical connections of the remap modules S1.

The chip enable interface 613 is respectively coupled to the ports T1, T2, T3, and T4 of the remap module S1 through ports CE1, CE2, CE3, and CE4 for respectively transmitting chip enable signals to the remap module S1.

The remap module SI is respectively coupled to the chip enable interface M13, M23, M33, and M43 through the ports T5, T6, T7 and T8. Each of T5-T8 ports could be configured to couple to any of T1-T4 ports according to the switch signals received on the control port C1 of the remap module S1.

Please continue referring to FIG. 6. In the default status, the switch interface 615 transmit default switch signals to the remap modules S1 so that respectively the ports T1-T4 are sequentially coupled to the ports T5-T8 in the remap modules S1. Thus, the NAND flash memory system 600 works the same as the conventional NAND flash memory system 200. But when one of the NAND flash memory modules is dead, the switch interface 615 transmits switch signals to change the connections between the NAND flash memory controller 610 and the NAND flash memory modules M1-M4 to allow the NAND flash memory system 600 to still work as if no NAND flash memory module is dead but only the total memory size is decreased. For example, if the NAND flash memory module M1 is dead, the switch interface 615 transmits a switch signal to the control port C1 of the remap modules S1 for coupling the ports T1, T2, and T3 respectively to the ports T6, T7, T8. In this way, the condition is almost the same as the NAND flash memory system 200 with 3 NAND flash memory modules. The difference is the memory size is decreased. For example, the chip enable interface 613 is still able to transmit the chip enable signal through the port CE1, but the chip enable signal is transmitted, through the remap module S1, to the chip enable interface M23 of the NAND flash memory module M2 instead of the dead NAND flash memory module M1. Thus, the drawback of the conventional NAND flash memory system is solved and the NAND flash memory system 600 still works with the 3 active NAND flash memory modules.

Besides, the NAND flash memory controller 610 does not have to detect the condition of each NAND flash memory module all the time. Instead, the NAND flash memory controller 610 detects the conditions of the NAND flash memory modules M1 to M4 at the beginning, transmits the switch signal to the remap modules S1 according to the detection result for forming correct connections between the NAND flash memory controller 610 and the NAND flash memory modules M1 to M4, and then the NAND flash memory controller 610 can correctly exchange data with the NAND flash memory modules M1 to M4 consequently. Or the controller 610 can detect conditions of the NAND flash memory modules every a period of time to ensure the detection result in compliance with the real condition.

Additionally, the amount of the NAND flash memory modules of the NAND flash memory systems 600 are not limited to 4. Instead, the NAND flash memory systems 600 of the present invention can comprises less or more NAND flash memory modules as long as the related design of the remap modules are accordingly changed.

Figure 7:
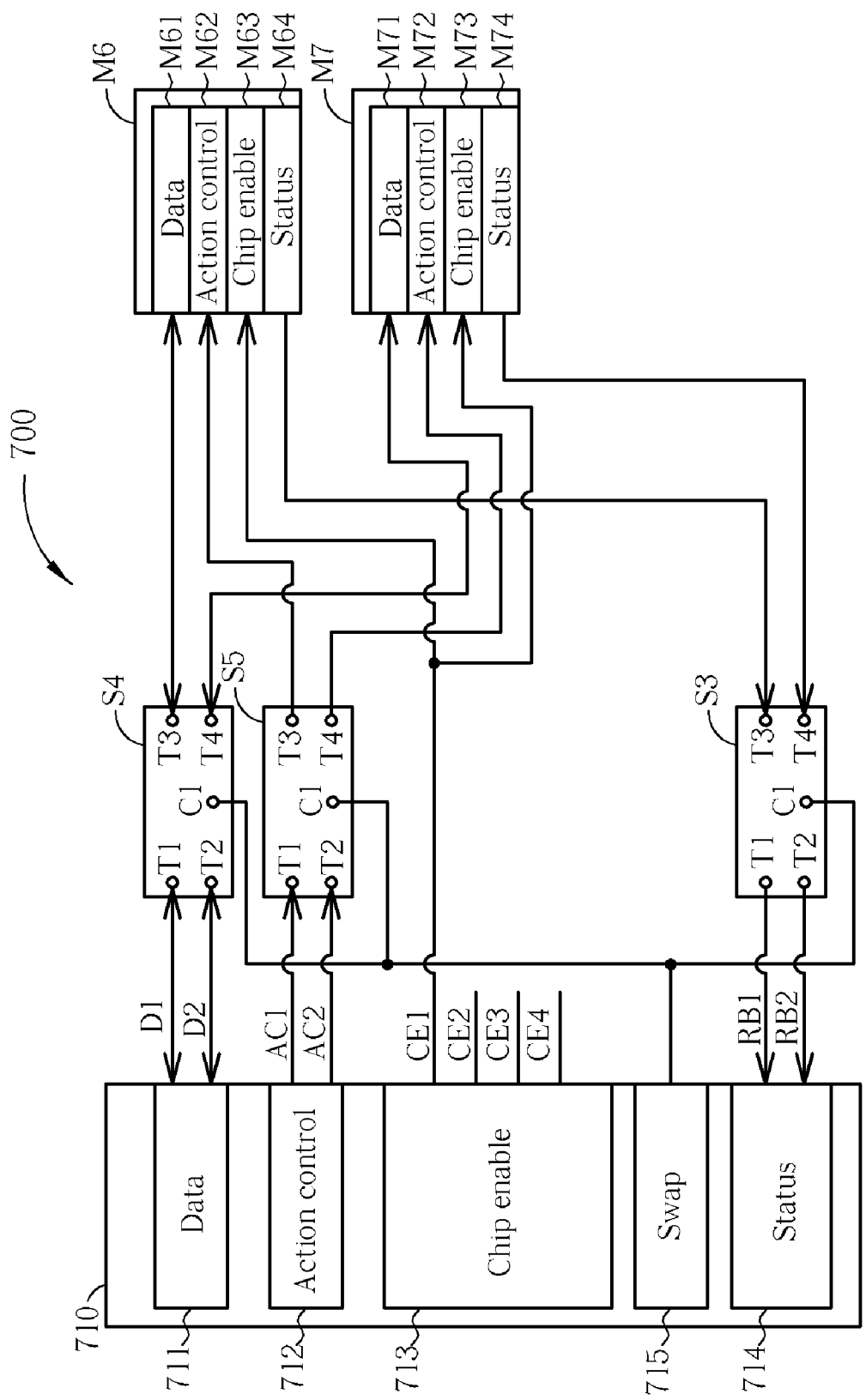
FIG. 7 is a diagram illustrating a dual channel NAND flash memory system of the second embodiment of the present invention.

Please refer to FIG. 7. FIG. 7 is a diagram illustrating a dual channel NAND flash memory system 700 of a second embodiment of the present invention. The dual channel NAND flash memory system 700 comprises a NAND flash memory controller 710, 2 NAND flash memory modules M6 and M7, and 3 swap modules S3, S4 and S5. The NAND flash memory controller 710 comprises a data interface 711, an action control interface 712, a chip enable interface 713, a status interface 714, and a swap interface 715. Each NAND flash memory module comprises a data interface, an action control interface, a chip enable interface, and a status interface. For example, the NAND flash memory module M6 comprises a data interface M61, an action control interface M62, a chip enable interface M63, and a status interface M64.

The swap interface 715 is conjointly coupled to the control ports C1 of the swap modules S3, S4 and S5 for transmitting switch signals to the swap modules S3, S4 and S5 and controlling the internal connections of the swap modules S3, S4 and S5.

The chip enable interface 713 is conjointly coupled to the chip enable interface M63 and M73 for transmitting chip enable signals to the NAND flash memory modules M6 and M7. For example, if the chip enable interface 713 transmits a chip enable signal, then the NAND flash memory modules M6 and M7 are both enabled to execute corresponding actions according to the action control signals.

The action control interface 712 is respectively coupled to the ports T1 and T2 of the swap module S5 through ports AC1 and AC2 for transmitting action control signals to the swap module S5. The ports T3 and T4 of the swap module S5 are respectively coupled to the action control interfaces M62 and M72. Each of the port T3 and T4 of the swap module S5 could be selectively couple to T1 or T2 according to the received swap signals on the control port C1. Thus, the action control signals are transmitted through the swap module S5 to control the actions of the NAND flash memory modules M6 and M7. For example, if the action control interface 712 is about to transmit an action control signal to the action control interface M62 of the NAND flash memory module M6 through the port AC1, then the swap interface 715 transmits a swap signal to the port C1 of the swap module S5 for the swap module S5 coupling the port T1 and the port T3 according to the swap signal. Thus, the action control signal can be transmitted from the port AC1 of the action control interface 712, through the ports T1 and T3 of the swap module S5, to the action control interface M62 of the NAND flash memory module M6, and if the NAND flash memory module M6 is enabled, the NAND flash memory module M6 executes corresponding actions according to the action control signals. And if the action control interface 712 is about to transmit an action control signal to the action control interface M72 of the NAND flash memory module M7 through the port AC1, then the swap interface 715 transmits a swap signal to the port C1 of the swap module S5 for the swap module S5 coupling the port TI and the port T4 according to the swap signal. Thus, the action control signal can be transmitted from the port AC1 of the action control interface 712, through the ports T1 and T4 of the swap module S5, to the action control interface M72 of the NAND flash memory module M7, and if the NAND flash memory module M7 is enabled, the NAND flash memory module M7 executes corresponding actions according to the action control signals.

The data interface 711 is respectively coupled to the ports T1 and T2 of the swap module S4 through the data ports D1 and D2 for exchanging data. The ports T3 and T4 of the swap module S4 are respectively coupled to the data interfaces M61 and M71. Each of the port T3 and T4 of the swap module S4 could be selectively couple to T1 or T2 according to the received swap signals on the control port Cl. Thus, the data are exchanged through the swap module S4 with the data interface M61 and M71 of the NAND flash memory modules M6 and M7. Generally, the data ports D1 and D2 are both an 8-bit data port, and each data interface of the NAND flash memory modules M6 and M7 has an 8-bit data port as well. Therefore the ports T1, T2, T3, and T4 of the swap module S4 are 8-bit data ports.

The status interface 714 is respectively coupled to the ports T1 and T2 of the swap module S3 through the data ports RB1 and RB2 for exchanging data. The ports T3 and T4 of the swap module S3 are respectively coupled to the status interfaces M64 and M74. Each of the port T3 and T4 of the swap module S3 could be selectively couple to T1 or T2 according to the received swap signals on the control port C1. Thus, the status signals are transmitted through the swap module S3 to indicate the status of the NAND flash memory modules M6 and M7.

Please continue referring to FIG. 7. In the default status, the swap interface 715 does transmit default swap signals to the swap modules S3, S4 and S5 so that respectively the ports T1 and T2 are sequentially coupled to the ports T3 and T4 in the swap modules S3, S4 and S5. Thus, the NAND flash memory system 700 works the same as the conventional NAND flash memory system 300. But when the NAND flash memory controller 710 detect the NAND flash memory module M6 is dead, the switch interface 715 transmits swap signals to change the connections between the NAND flash memory controller 710 and the NAND flash memory modules M6 and M7 to allow the NAND flash memory system 700 to still work as a single channel system with total memory size decreased for 50%. In detail, if the NAND flash memory module M6 is dead, the swap interface 715 transmits a swap signal to the control port C1 of the remap modules S3, S4 and S5 for coupling the ports T1 to the port T4 and T2 to the port T3 in the swap modules S3, S4 and S5. In this way, the condition is almost the same as the NAND flash memory system 100. For example, the action control interface 712 is still able to transmit the action control signal through the port AC1, but the action control signal is transmitted, through the swap module S5, to the action control interface M72 of the NAND flash memory module M7 instead of the dead NAND flash memory module M6. On another aspect, when the NAND flash memory controller 710 detects the NAND flash memory module M7 dead, the swap interface 715 transmits default swap signal and the NAND flash memory system 700 still works as a single channel NAND flash memory system with the active NAND flash memory module M6. Thus, the drawback of the conventional NAND flash memory system is solved and the NAND flash memory system 700 still works with the 1 active NAND flash memory module.

Besides, the NAND flash memory controller 710 does not have to detect the condition of each NAND flash memory module all the time. Instead, the NAND flash memory controller 710 detects the conditions of the NAND flash memory modules M6 and M7 at the beginning, transmits the swap signal to the swap modules S3, S4 and S5 according to the detection result for forming correct connections between the NAND flash memory controller 710 and the NAND flash memory modules M6 and M7, and then the NAND flash memory controller 710 can correctly exchange data with the NAND flash memory modules M6 and M7 consequently. Or the controller 510 can detect conditions of the NAND flash memory modules every a period of time to ensure the detection result in compliance with the real condition.

Figure 8:
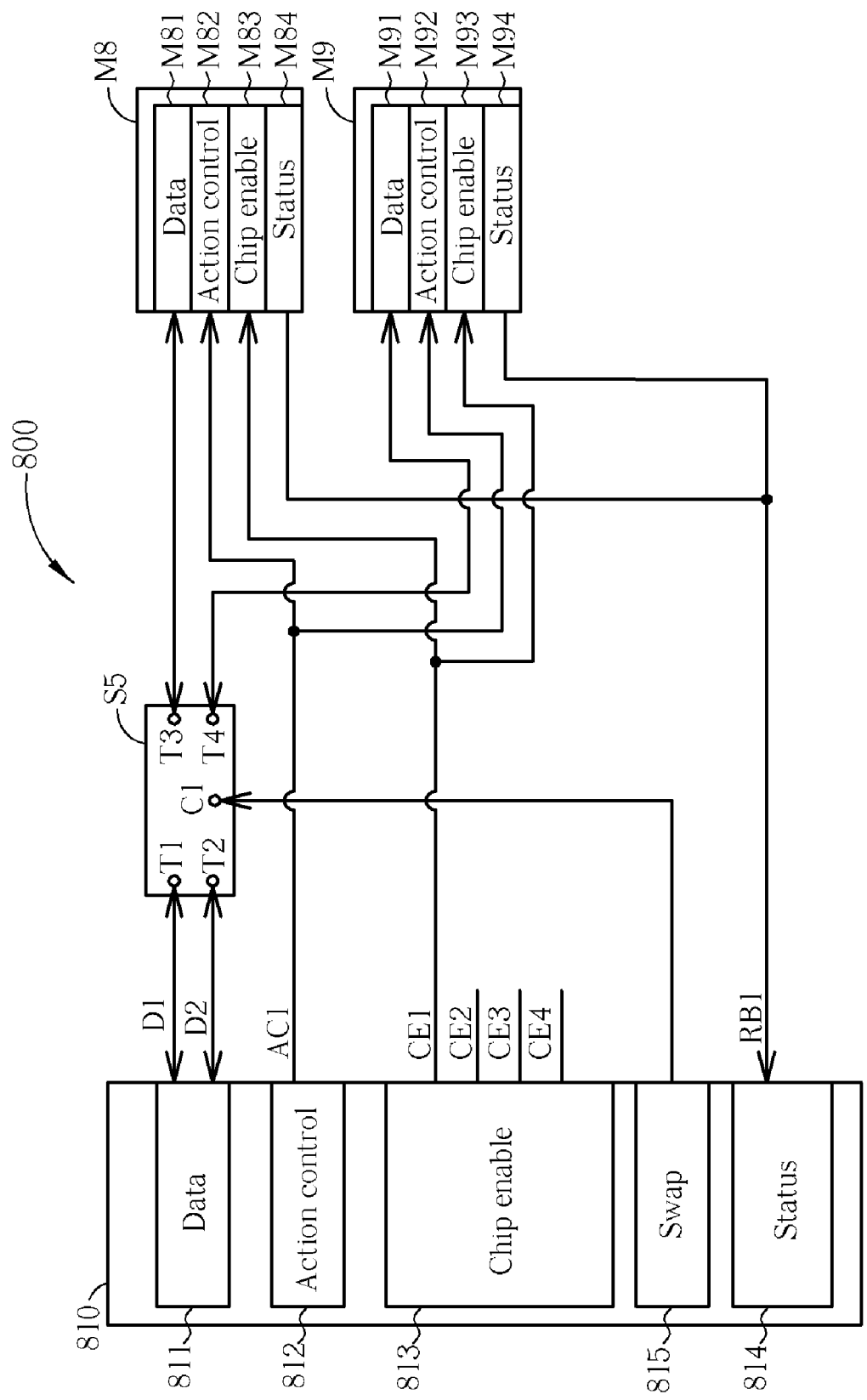
FIG. 8 is a diagram illustrating a dual channel NAND flash memory system of the third embodiment of the present invention.

Please refer to FIG. 8. FIG. 8 is a diagram illustrating a dual channel NAND flash memory system 800 of a third embodiment of the present invention. All the components in FIG. 8 are similar to those in FIG. 7 and thus the related description is omitted. The difference between the dual channel NAND flash memory system 700 and the dual channel NAND flash memory system 800 is that the dual channel NAND flash memory system 800 does not comprises the swap module S3 and S4. Instead, the status interface of each NAND flash memory module in FIG. 8 is conjointly coupled to the status interface 814 of the NAND flash memory controller 810. In this way, as long as M8 or M9 is busy, the NAND flash memory controller 810 considers both the NAND flash memory modules M8 and M9 are busy and halts the related action. The related action is not continued until all the NAND flash memory modules M8 and M9 are ready. The design in FIG. 8 of the present invention can save two swap modules.

Figure 9:
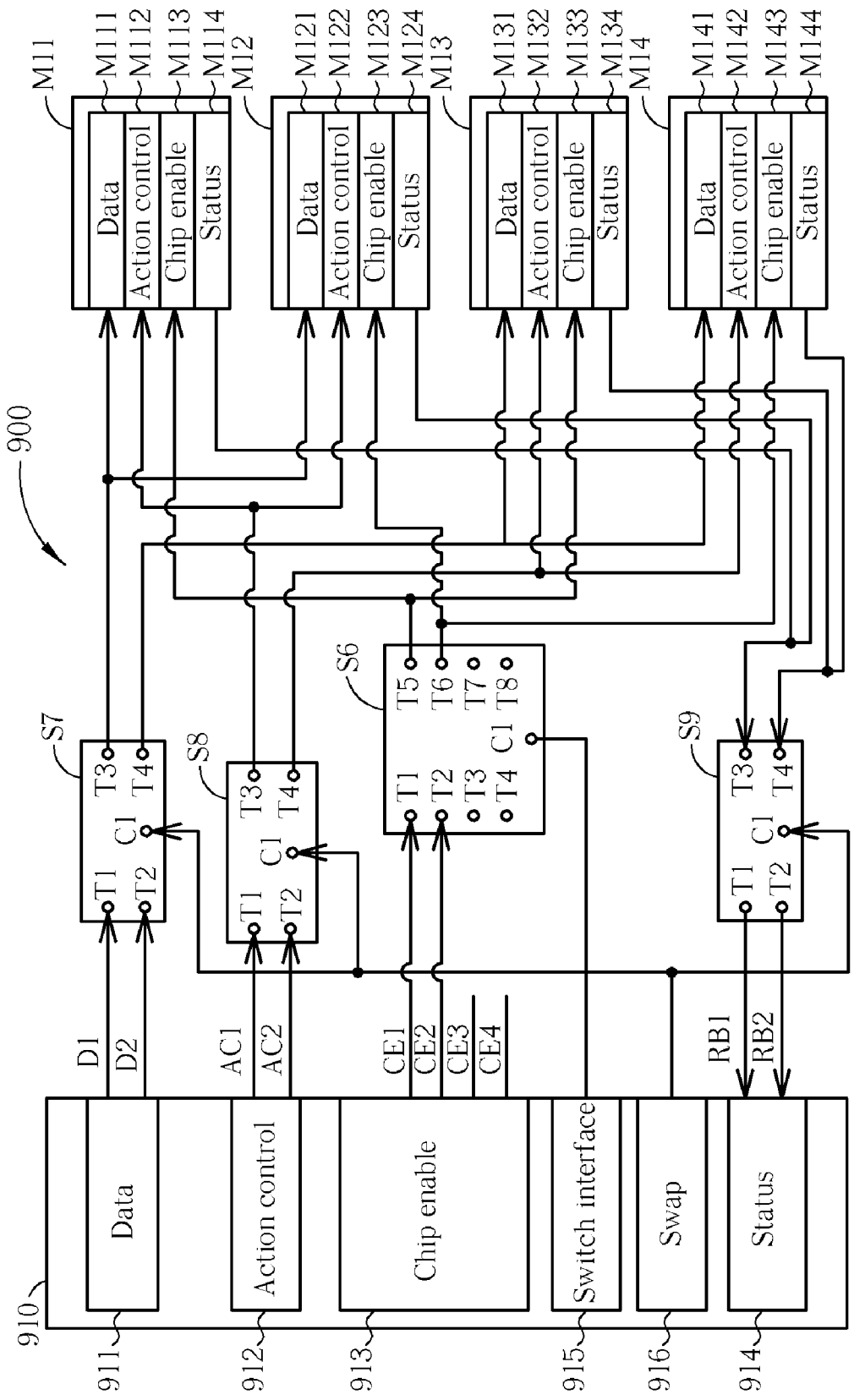
FIG. 9 is a diagram illustrating a dual channel NAND flash memory system of the fourth embodiment of the present invention.

Please refer to FIG. 9. FIG. 9 is a diagram illustrating a dual channel NAND flash memory system 900 of a fourth embodiment of the present invention. The dual channel NAND flash memory system 900 comprises a NAND flash memory controller 910, 4 NAND flash memory modules M11, M12, M13 and M14, and 1 remap modules S6 and 3 swap modules S7, S8 and S9. The NAND flash memory controller 910 comprises a data interface 911, an action control interface 912, a chip enable interface 913, a status interface 914, a switch interface 915, and a swap interface 916. The NAND flash memory modules M11-M14 are the same as the NAND flash memory module M1.

The data interface 911 has two ports D1 and D2 respectively coupled to the ports T1 and T2 of the swap module S7. Both of the ports D1 and D2 transmit or receive data with 8-bit width so that the total data width is doubled.

The swap module S7 has 4 ports T1 to T4, and a control port C1. The ports T3 of the swap module S7 is coupled to the data interface M111 of the NAND flash module M11 and the data interface M121 of the NAND flash module M12. The ports T4 of the swap module S7 is coupled to the data interface M131 of the NAND flash module M13 and the data interface M141 of the NAND flash module M14. Each of the port T3 and T4 of the swap module S7 could be selectively couple to T1 or T2 according to the received swap signals on the control port C1. For example, if the port T1 of the swap module S7 is coupled to the port T3, the port D1 of the data interface 911 is conjointly coupled to the data interfaces M111 and M121. Generally, the data ports D1 and D2 of the data interface 911 are both an 8-bit data port, and each data interface of the NAND flash memory modules M11 to M14 has an 8-bit data port as well. Therefore the ports T1, T2, T3, and T4 of the swap module S7 are 8-bit data ports.

The action control interface 912 has two ports AC1 and AC2 respectively coupled to the ports T1 and T2 of the swap module S8. Both of the ports AC1 and AC2 transmit action control signals for controlling actions of the NAND flash modules.

The swap module S8 has 4 ports T1 to T4, and a control port C1. The ports T3 of the swap module S8 is coupled to the action control interface M112 of the NAND flash module M11 and the action control interface M122 of the NAND flash module M12. The ports T4 of the swap module S8 is coupled to the action control interface M132 of the NAND flash module M13 and the action control interface M142 of the NAND flash module M14. Each of the port T3 and T4 of the swap module S8 could be selectively couple to T1 or T2 according to the received swap signals on the control port C1. For example, if the port T1 of the swap module S8 is coupled to the port T3, the port AC1 of the action control interface 912 is conjointly coupled to the action control interfaces M112 and M122.

The chip enable interface 913 has four ports CE1-CE4. CE1 and CE2 are respectively coupled to the ports T1 and T2 of the remap module S6. Both of the ports CE1 and CE2 transmit chip enable signals for enabling the NAND flash modules.

The remap module S6 has 8 ports T1 to T8, and a control port C1. The ports T5 of the remap module S6 is coupled to the chip enable interface M113 of the NAND flash module M11 and the chip enable interface M133 of the NAND flash module M13. The ports T6 of the remap module S6 is coupled to the chip enable interface M123 of the NAND flash module M12 and the chip enable interface M143 of the NAND flash module M14. The T5~T8 port of the remap module S6 could couple to any of T1 to T4 ports. For example, if the port T5 of the remap module S6 is coupled to the port T1, the port CE1 of the chip enable interface 913 is conjointly coupled to the chip enable control interfaces M113 and M133.

The status interface 914 has two ports RB1 and RB2 respectively coupled to the ports T1 and T2 of the swap module S9. Both of the ports RB1 and RB2 receive status signals for informing if the NAND flash memory modules are ready to the NAND flash memory controller 910.

The swap module S9 has 4 ports T1 to T4, and a control port C1. The ports T3 of the swap module S9 is coupled to the status interface M114 of the NAND flash module M11 and the status interface M124 of the NAND flash module M12. The ports T4 of the swap module S9 is coupled to the status interface M134 of the NAND flash module M13 and the status interface M144 of the NAND flash module M14. Each of the port T3 and T4 of the swap module S9 could be selectively couple to T1 or T2 according to the received swap signals on the control port C1. For example, if the port T3 of the swap module S9 is coupled to the port T1, the port RB1 of the status interface 914 is conjointly coupled to the status control interfaces M114 and M124.

The swap interface 916 is conjointly coupled to the control ports C1 of the swap modules S7, S8 and S9 for transmitting swap signals to the swap modules S7, S8 and S9 and controlling the internal connections of the swap modules S7, S8 and S9.

The switch interface 915 is coupled to the control ports C1 of the remap modules S6 for transmitting switch signals to the remap modules S6 and controlling the internal connections of the remap modules S6.

In default status, it is assumed that all the swap modules S7 to S9 have the same internal connections: the port T1 is coupled to the port T3, and the port T2 is coupled to the port T4. And the switch module S6: T1-T4 are coupled to T5-T8 sequentially. Consequently, the data interface 911 can transmit data to the data interface M111 of the NAND flash memory module M11 and the data interface M121 of the NAND flash memory module M12 through the port D1, and can transmit data to the data interface M131 of the NAND flash memory module M13 and the data interface M141 of the NAND flash memory module M14 through the port D2. The action control interface 912 can transmit action control signals to the action control interface M112 of the NAND flash memory module M11 and the action control interface M122 of the NAND flash memory module M12 through the port AC1, and can transmit action control signals to the action control interface M132 of the NAND flash memory module M13 and the action control interface M142 of the NAND flash memory module M14 through the port AC2. The chip enable interface 913 can transmit chip enable signals to the chip enable interface M113 of the NAND flash memory module M11 and the chip enable interface M133 of the NAND flash memory module M13 through the port CE1, and can transmit chip enable signals to the chip enable interface M123 of the NAND flash memory module M12 and the chip enable interface M143 of the NAND flash memory module M14 through the port CE2. The status interface 914 can receive status signals from the status interface M114 of the NAND flash memory module M11 and the status interface M124 of the NAND flash memory module M12 through the port RB1, and can receive status signals from the status interface M134 of the NAND flash memory module M13 and the status interface M144 of the NAND flash memory module M14 through the port RB2.

When the NAND flash memory controller 910 detects one of the NAND flash memory modules M11 to M14, the NAND flash memory controller could transmit swap signals and switch signals to configure the NAND flash memory controller for avoiding the NAND flash memory system failing.

For example, if the NAND flash memory module M11 is dead, there are two choices for avoiding the system failing. The choice 1 is the NAND flash memory controller could transmit swap signals to change the internal connections of the swap modules S7, S8 and S9, the ports T3 of the swap modules S7, S8 and S9 are respectively coupled to the ports T2 of the swap modules S7, S8 and S9, and the ports T1 of the swap modules S7, S8 and S9 are respectively coupled to the ports T4 of the swap modules S7, S8 and S9. Thus, the NAND flash memory system 900 still works as a single channel memory system 200 with the NAND flash memory modules M13 and M14.

The choice 2 is the NAND flash memory controller could transmit switch signal to change the internal connections of the remap modules S6, the port T1 of the remap modules S6 is coupled to the ports T6 of the remap modules S6. Thus, the NAND flash memory system 900 still works as a dual channel memory system 300 with the NAND flash memory modules M12 and M14.

Additionally, the amount of the NAND flash memory modules of the NAND flash memory systems 600, 700, 800, 900 are not limited. Instead, the NAND flash memory systems 600, 700, 800, 900 of the present invention can comprise less or more NAND flash memory modules.

In the NAND flash memory system 600, 700, 800 and 900. Then NAND flash memory controller has two data ports and four chip enable ports. If the number of data ports or chip enable ports of the NAND flash memory controller are different from the NAND flash memory controller shown in above embodiments, the swap module and remap module are according changed. For example, if the NAND flash memory controller has two chip enable ports only, then the remap module could be designed to have four ports T1~T4 and a control port C1. The T3 and T4 could be configured to couple to T1 or T2 port.

Additionally, in the flash memory systems 700, 800, and 900, the amount of the swap modules does not have to be as the same as the figures shows. For example, in the flash memory system 700, the status interfaces M64 and M74 can be both coupled to the port RB1 of the flash memory controller 710. In this way, the swap module S3 can be saved. But if the high-byte flash memory module (for example, M6) and low-byte flash memory module (for example, M7) are coupled to different port of the flash memory controller, then a swap module is required. For example, in system 700, the flash memory modules M6 and M7 connects to different data/action/status ports. Therefore, 3 swap modules are required.

Figure 10:
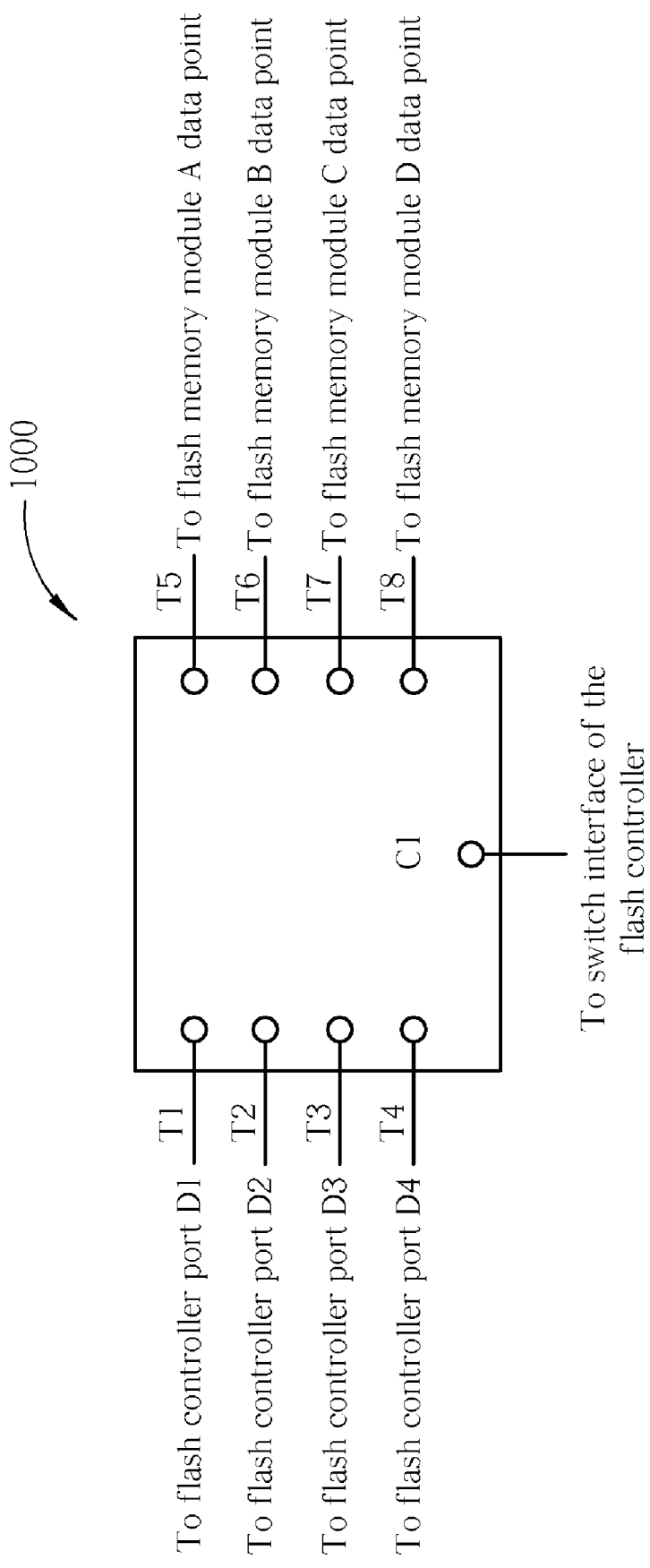
FIG. 10 is a diagram illustrating a swap module disposed in a 4-channel NAND flash memory system.

Please refer to FIG. 10. FIG. 10 is a diagram illustrating a swap module 1000 disposed in a 4-channel NAND flash memory system. The 4 ports T1, T2, T3, and T4 of the swap module 1000 are respectively coupled to the data ports D1, D2, D3, and D4 of a NAND flash memory controller. The 4 ports T5, T6, T7, and T8 of the swap module 1000 are respectively coupled to the data ports of the NAND flash memory modules A, B, C, and D. Each of T5-T8 port could be configured to couple to any of T1-T4 port according to the swap signals received on the control port C1. The control port C1 of the swap module 1000 is coupled to the swap interface of the NAND flash memory controller. Thus, the NAND flash memory controller adjusts the connections between the NAND flash memory controller and the NAND flash memory modules A, B, C, D by controlling the swap module 1000 according to the status (live or dead) of the NAND flash memory modules A, B, C, and D.

Figure 11:
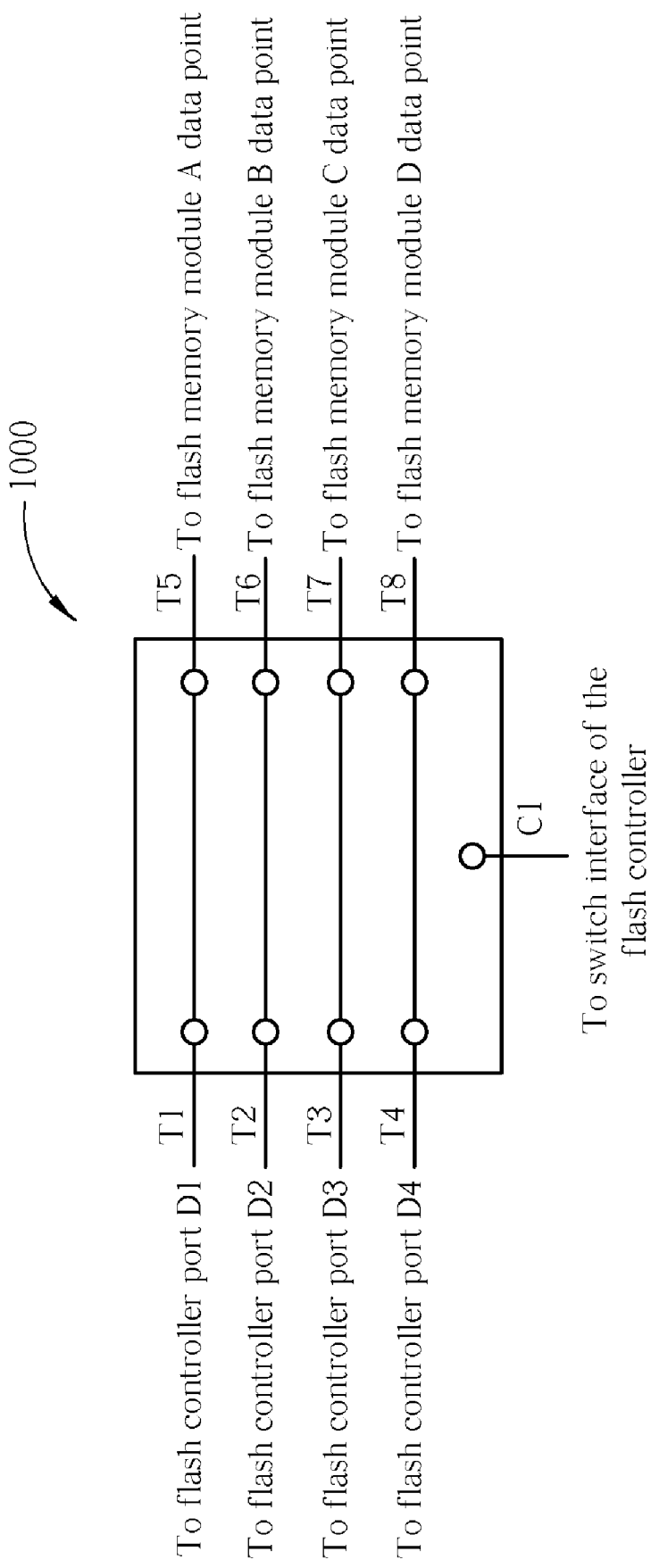
FIG. 11 is a diagram illustrating the default status of the swap module.

Please refer to FIG. 11. FIG. 11 is a diagram illustrating the default status of the swap module 1000. In default status, the ports T1, T2, T3, and T4 are respectively coupled to the ports T5, T6, T7, and T8. In this way, the data ports D1, D2, D3, and D4 of the NAND flash memory controller are respectively coupled to the data ports of the NAND flash memory modules A, B, C, and D.

Figure 12:
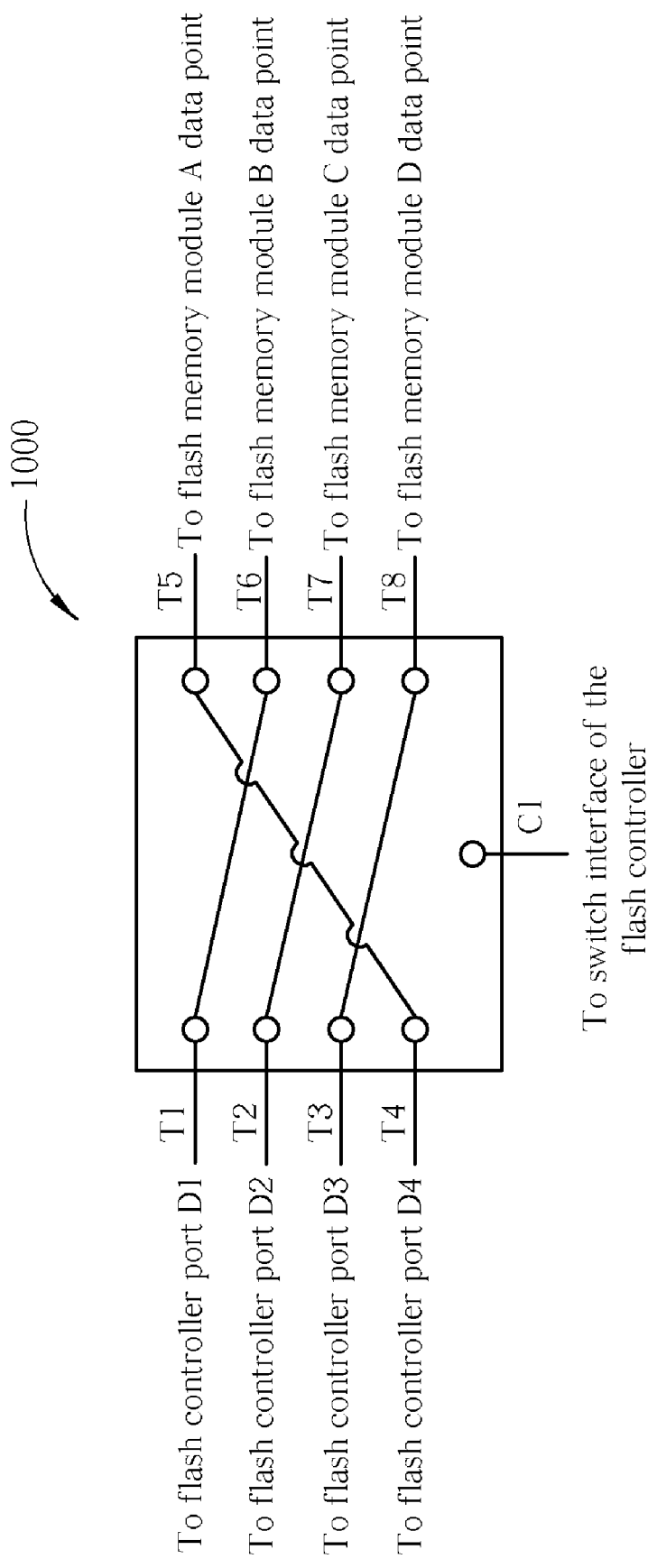
FIG. 12 is a diagram illustrating the internal connections of the swap module when the NAND flash memory module A is dead.

Please refer to FIG. 12. FIG. 12 is a diagram illustrating the internal connections of the swap module 1000 when the NAND flash memory module A is dead. As shown in FIG. 12, after the NAND flash memory controller finds the NAND flash memory module A dead, the NAND flash the port T6 coupled to the port T1, the port T7 coupled to the port T2, the port T8 coupled to the port T3. In this way, the NAND flash memory system still works as a 3-channel NAND flash memory system.

Figure 13:
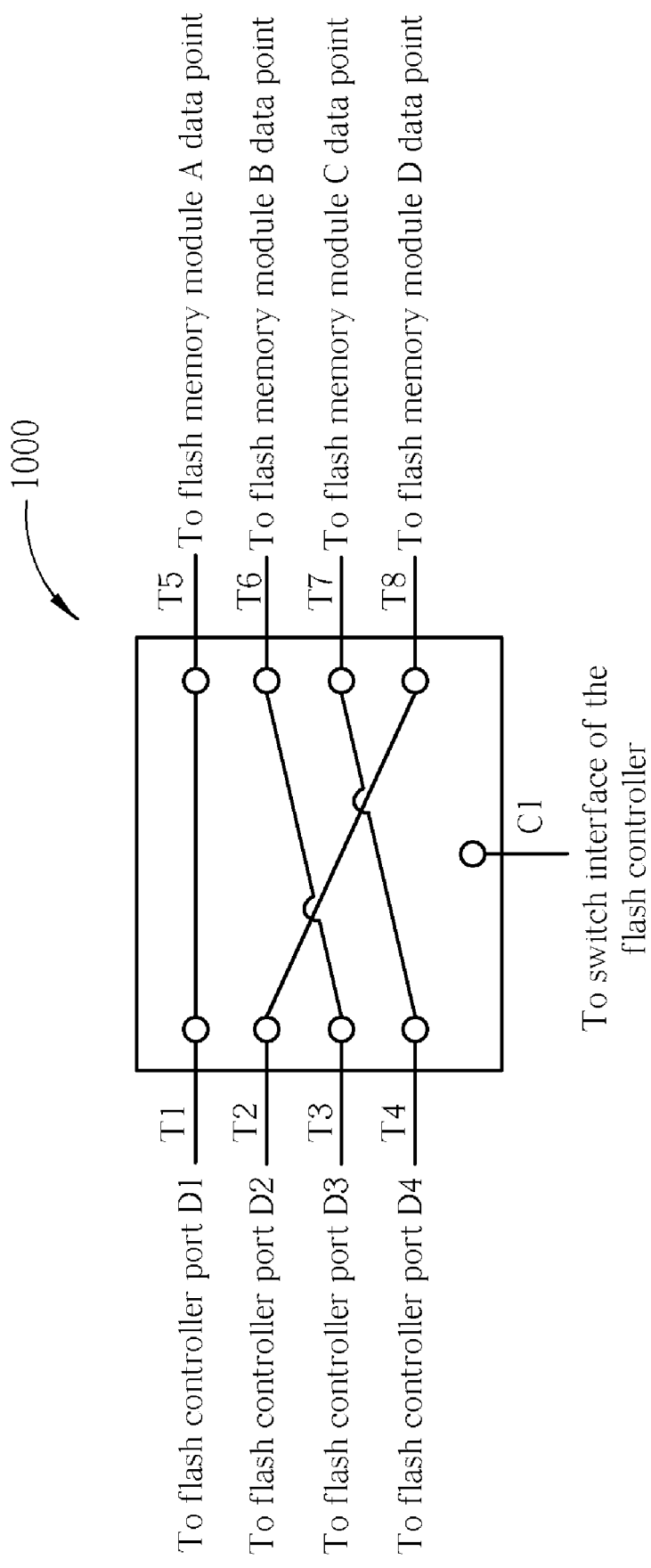
FIG. 13 is a diagram illustrating the internal connections of the swap module when the NAND flash memory modules B and C are dead.

Please refer to FIG. 13. FIG. 13 is a diagram illustrating the internal connections of the swap module 1000 when the NAND flash memory modules B and C are dead. As shown in FIG. 13, after the NAND flash memory controller finds the NAND flash memory modules B and C dead, the NAND flash memory controller controls the ports T5 coupled to the port T1, and the port T8 coupled to the port T2. In this way, the NAND flash memory system still works as a 2-channel NAND flash memory system.

Additionally, in the flash memory system 1000, the swap module has to be disposed when the flash memory modules are coupled to different ports of the flash memory controller. Therefore, if the flash memory modules are coupled to the same port of the flash memory controller, then the swap module can be saved.

The NAND flash memory controller, the swap modules, and the remap modules, can be merged in a chip.

Figure 14:
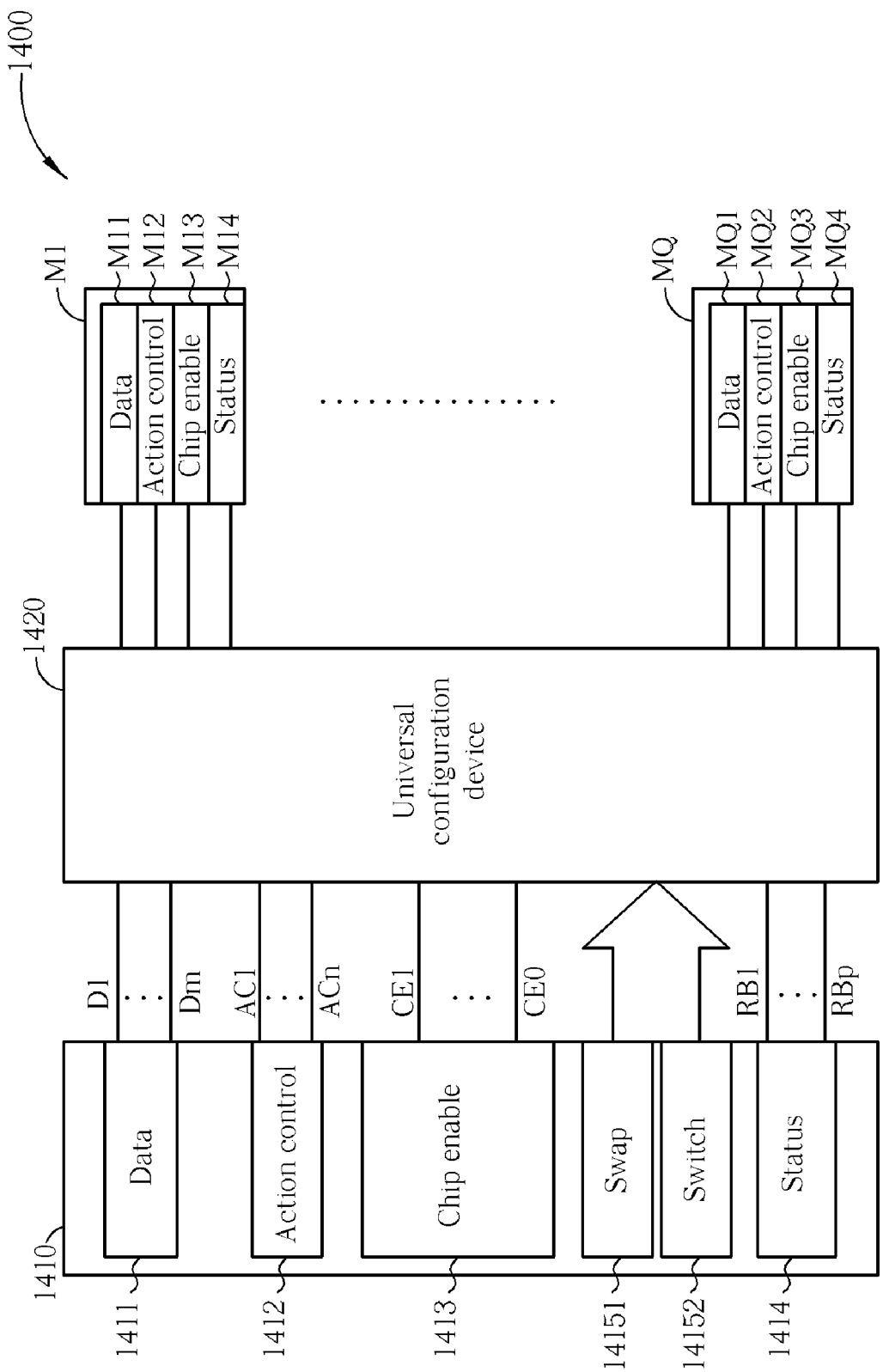
FIG. 14 is a diagram illustrating a NAND flash memory system of a fifth embodiment of the present invention.

Please refer to FIG. 14. FIG. 14 is a diagram illustrating a NAND flash memory system 1400 of a fifth embodiment of the present invention. The NAND flash memory system 1400 comprises a NAND flash memory controller 1410, a universal connection device 1420, and a plurality of NAND flash memory modules M1~MQ. The spirit of the NAND flash memory system 1400 is to provide a system using a same Print Circuit Board (PCB) with different applications. The amounts of ports of data interface, the action control interface, the chip enable interface, and the status interface of the NAND flash memory controller 1410 is designed according to the user's need. The amounts of NAND flash memory modules also can be designed according to the user's need. All ports from the NAND flash memory controller 1410 are coupled to the universal connection device 1420, and all ports from the NAND flash memory modules are coupled to the universal connection device 1420. The switch interface 14152 and swap interface 14151 of the NAND flash memory controller controls the internal connections of the universal connection device 1420. Thus, the connections between the NAND flash memory controller 1410 and the plurality of the NAND flash memory modules can be changed by controlling the internal connections of the universal connection device 1420. Conventionally, each of the flash memory system requires different PCB. In the NAND flash memory system 1400, the user can utilize a universal PCB for the single, dual, single-channel interleaved, dual-channel interleaved or multiple channel NAND flash memory systems as long as the universal connection device 1420 is included. Thus, efforts to maintain these PCBs can be saved.

Figure 15:
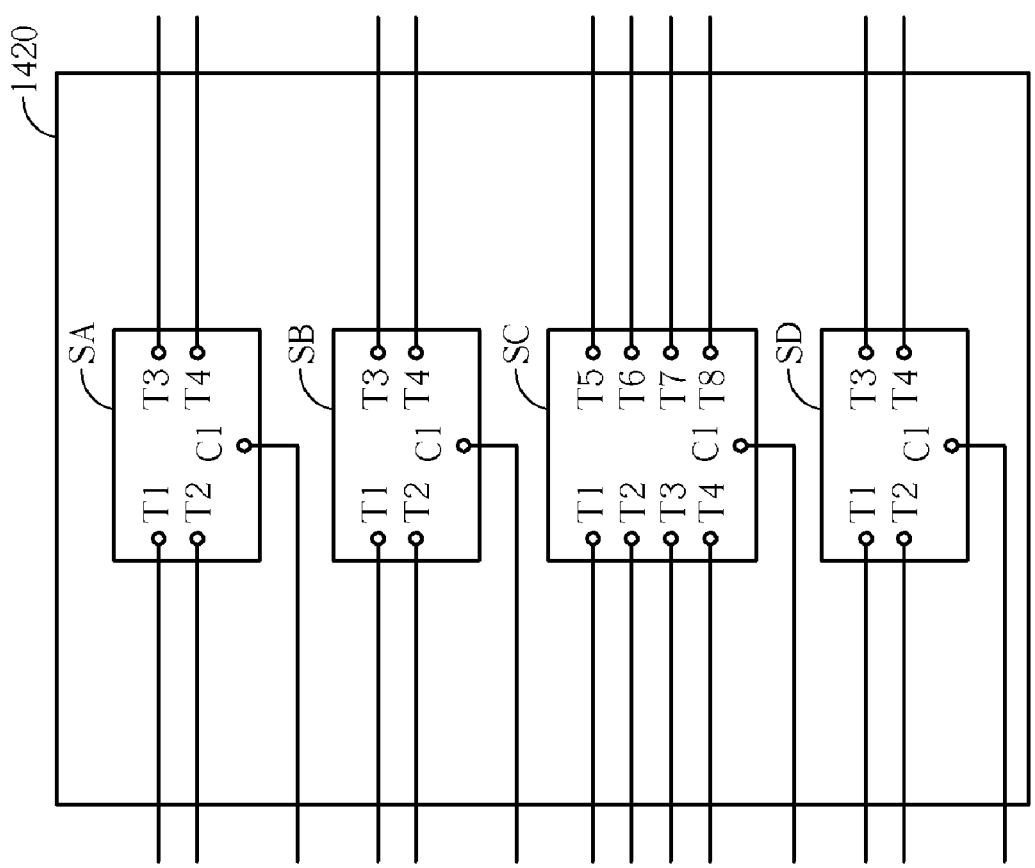
FIG. 15 is a diagram illustrating the internal connections of the universal connection device.

Please refer to FIG. 15. FIG. 15 is a diagram illustrating the details of the universal connection device 1420 which could support single and dual-channel systems and 4 ports CE1 to CE4 at most. As shown in FIG. 15, the universal connection device 1420 comprises 3 swap modules SA, SB, and SD and 1 switch module SC. Each of the swap modules SA, SB, and SD has ports T1~T4. The switch module SC has ports T1~T8. The internal connections of all the modules SA~SD can be controlled through their control ports C1. Therefore, the controller 1410 can control a single-channel system or a dual-channel system through programming the internal connections of the modules SA~SD of the universal connection device 1420.

Figure 16:
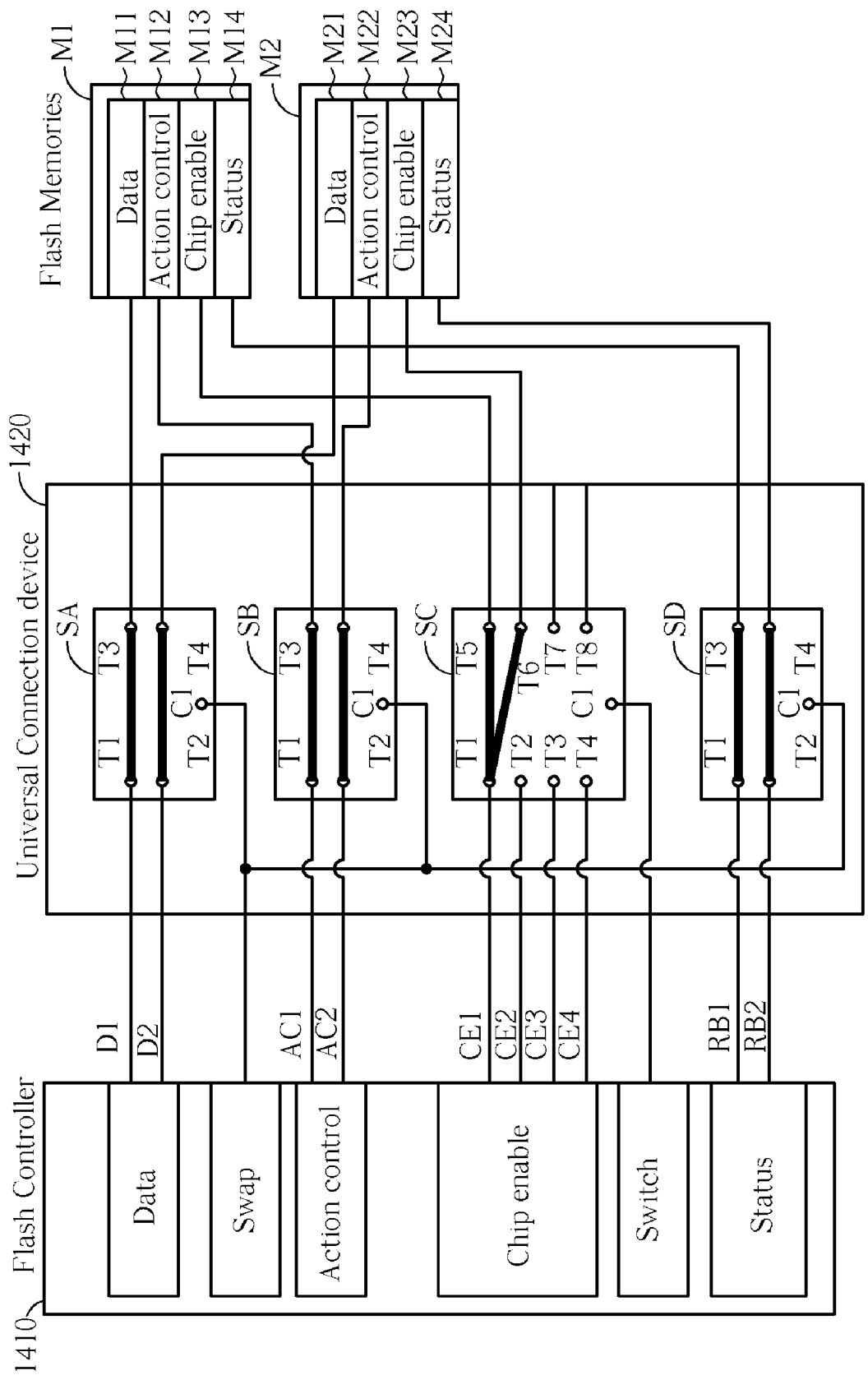
FIG. 16~FIG. 19 is diagram illustrating the applications of the universal connection device.

Please refer to FIG. 16. FIG. 16 shows a NAND flash memory system which comprises one dual-channel NAND flash memory controller and 2 NAND flash memory modules. If the NAND flash memory system is to be configured as a dual-channel NAND flash memory system. Then the NAND flash memory controller transmits swap signal to make T1 and T2 couple to T3 and T4 in the three swap modules. The NAND flash memory controller also transmits a switch signal to make T5 couple to T1 and T6 couple to T1 in the switch module. Then the NAND flash system is like NAND flash memory system 300 which is a dual-channel NAND flash memory system.

Figure 17:
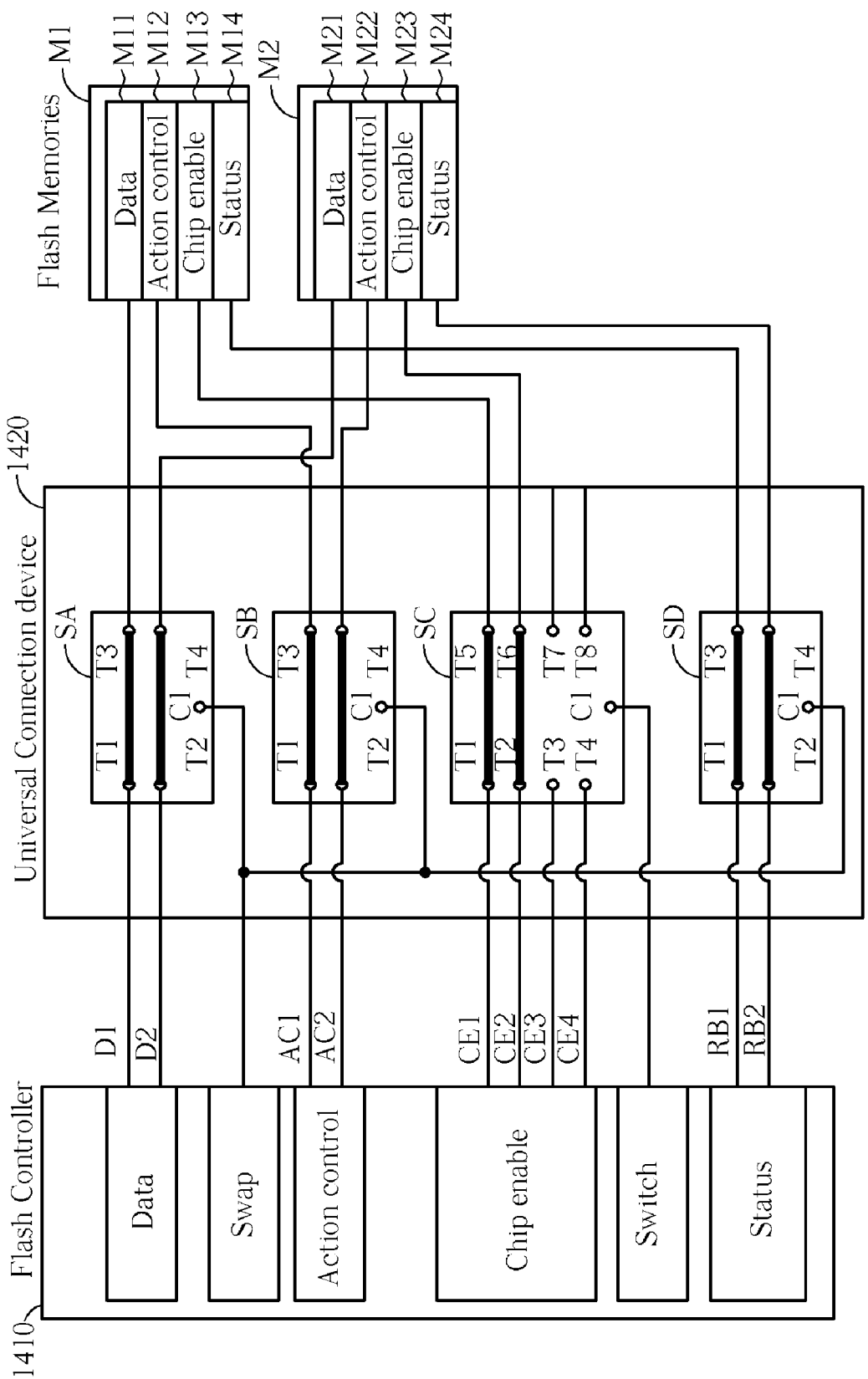
Figure 18:
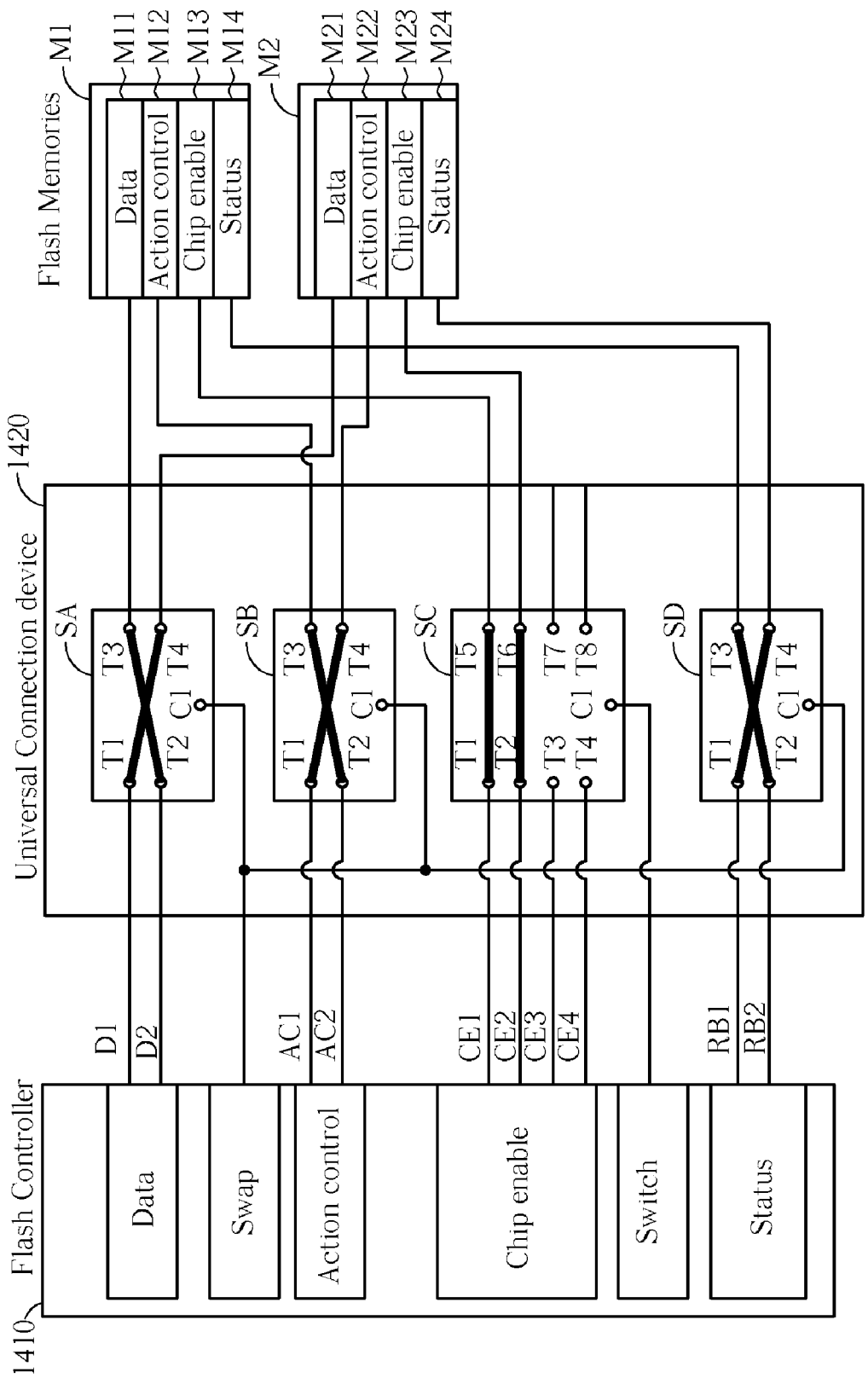

Please refer to FIG. 17 and FIG. 18. FIG. 17 and FIG. 18 show a NAND flash memory system which comprises the same components as shown in FIG. 16. If the NAND flash memory system is to be configured as a single-channel NAND flash memory system, Then the NAND flash memory controller transmits swap signal to make T1 and T2 couple to T3 and T4 in the three swap modules when CE1 is 0 and CE2 is 1. The NAND flash memory controller also transmits a swap signal to make T1 and T2 couple to T4 and T3 in the three swap modules when CE1 is 1 CE2 is 0. Then the NAND flash memory system is like NAND flash memory system 200 with 2 NAND flash memory.

Figure 19:
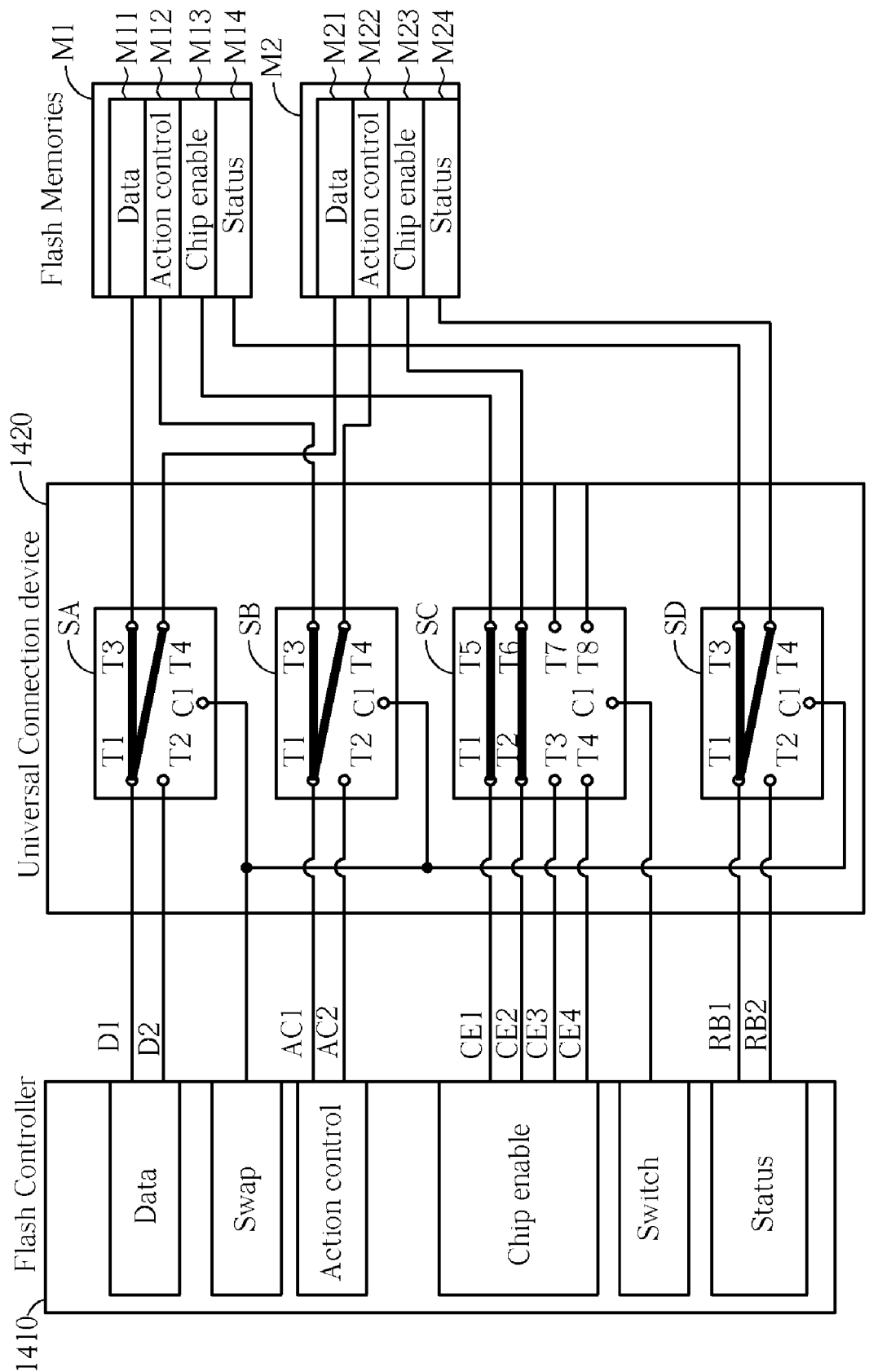

Please refer to FIG. 19. FIG. 19 illustrates the NAND flash memory controller have single-channel interface, the same PCB could also be used. If the NAND flash memory controller is single-channel, then the swap interface transmits a swap signal to make T1 couple to T3 and T1 couple to T4 in the three swap modules. Then, the NAND flash memory system is like NAND flash memory system 200 with 2 NAND flash modules.

The NAND flash memory system of the present invention can be NAND flash memory card system, USB NAND flash disk system, SATA NAND flash disk system, solid-state-disk NAND flash disk system, PCI express NAND flash disk system.

To sum up, the present invention provides a flexible NAND flash memory system capable of changing the connections between the NAND flash memory controller and the NAND flash memory modules. In this way, when a NAND flash memory module is dead, the system still works with the active NAND flash memory modules. And the PCB requirement can be reduced by the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A single channel NAND flash memory system comprising:
   a NAND flash memory controller comprising:
      a data interface, comprising a controller data port for exchanging data;
      a switch interface for transmitting a switch signal;
      an action control interface, comprising a controller action port for transmitting an action control signal;

a chip enable interface for transmitting chip enable signals, the chip enable interface comprising a plurality of controller chip enable ports, each controller chip enable port transmitting a corresponding chip enable signal; and a status interface for receiving status signals, the status interface comprising a plurality of controller status ports, each controller status port receiving a corresponding status signal;

a plurality of NAND flash memory modules, each NAND flash memory module comprising:
a data interface coupled to the data interface of the NAND flash memory controller for exchanging data via the controller data port;
a chip enable interface for receiving the corresponding chip enable signal;
an action control interface coupled to the action control interface of the NAND flash memory controller for receiving the action control signal via the controller action port; and
a status interface for transmitting the status signal to the corresponding controller status port;

a remap module comprising:
a control port coupled to the switch interface for receiving the switch signal;
a plurality of first ports, each of the first ports coupled to the corresponding controller chip enable port of the chip enable interface of the NAND flash memory controller for receiving the corresponding chip enable signal; and
a plurality of second ports, each of the second ports coupled to the chip enable interface of the corresponding NAND flash memory module and selectively coupled to one of the first ports according to the switch signal, for the corresponding chip enable signal received by the first ports to be transmitted to the chip enable interface of the corresponding NAND flash memory module.

2. The single channel NAND flash memory system of claim 1 wherein the memory controller transmits the switch signal according to condition of each of the plurality of the NAND flash memory modules.

3. The single channel NAND flash memory system of claim 1 being a USB NAND flash disk system.

4. The single channel NAND flash memory system of claim 1 being a NAND flash memory card system.

5. The single channel NAND flash memory system of claim 1 being a SATA (serial advanced technology attachment) NAND flash disk system.

6. The single channel NAND flash memory system of claim 1 being a solid-state-disk NAND flash disk system.

7. The single channel NAND flash memory system of claim 1 being a PCI express NAND flash disk system.

8. The single channel NAND flash memory system of claim 1 wherein the NAND flash memory controller and the remap module can be disposed in a same chip.

9. A dual channel NAND flash memory system comprising:
a NAND flash memory controller comprising:
a data interface for exchanging data, the data interface comprising a plurality of data ports;
a swap interface for transmitting a swap signal;
an chip enable interface, comprising a plurality of controller chip enable ports for transmitting a chip enable signal;

an action control interface for transmitting action control signals, the action control interface comprising two ports, each port transmitting a corresponding action control signal; and
a status interface for receiving status signals, the status interface comprising two ports, each port receiving a corresponding status signal;

a first NAND flash memory module comprising:
a data interface for exchanging data;
a chip enable interface coupled to one of the plurality of controller chip enable ports of the chip enable interface of the NAND flash memory controller for receiving the chip enable signal via the one of the plurality of controller chip enable ports;
an action control interface for receiving the corresponding action control signal; and
a status interface for transmitting the corresponding status signal;

a second NAND flash memory module comprising:
a data interface for exchanging data;
a chip enable interface coupled to the one of the plurality of controller chip enable ports of the chip enable interface of the NAND flash memory controller for receiving the chip enable signal via the one of the plurality of controller chip enable ports;
an action control interface for receiving the corresponding action control signal; and
a status interface for transmitting the corresponding status signal;

a first swap module comprising:
a control port coupled to the swap interface for receiving the swap signal;
two first ports, each of the first ports coupled to the corresponding port of the action control interface of the NAND flash memory controller for receiving the corresponding action control signal; and
two second ports, each of the second ports coupled to the action control interface of the corresponding NAND flash memory module and selectively coupled to one of the first ports according to the swap signal, for the corresponding action control signal received by the first ports to be transmitted to the action control interface of the corresponding NAND flash memory module;

a second swap module comprising:
a control port coupled to the swap interface for receiving the swap signal;
two first ports, each of the first ports coupled to the corresponding port of the status interface of the NAND flash memory controller for transmitting the corresponding status signal to the corresponding port of the status interface of the NAND flash memory controller; and
two second ports, each of the second ports coupled to the status interface of the corresponding NAND flash memory module for receiving the corresponding status signal and selectively coupled to one of the first ports according to the swap signal, for the corresponding status signal received by the second ports to be transmitted to the corresponding port of the status interface of the NAND flash memory controller; and a third swap module comprising:
a control port coupled to the swap interface for receiving the swap signal;
a plurality of first ports, each of the first ports coupled to the corresponding port of the data interface of the NAND flash memory controller;

wherein an amount of the plurality of the first ports of the third swap module is as the same as an amount of the plurality of the data ports of the NAND flash memory controller; and a plurality of second ports, each of the second ports coupled to the data interface of the corresponding NAND flash memory module and selectively coupled to one of the first ports according to the swap signal, so the data between the data interface of the NAND flash memory controller and the NAND flash memory module can be exchanged;

wherein an amount of the plurality of the second ports of the third swap module is as the same as an amount of the plurality of the data ports of the NAND flash memory controller.

10. The dual channel NAND flash memory system of claim 9 wherein the memory controller transmits the swap signal according to condition of each of the first and the second NAND flash memory modules.

11. The dual channel NAND flash memory system of claim 9 being a USB NAND flash disk system.

12. The dual channel NAND flash memory system of claim 9 being a NAND flash memory card system.

13. The dual channel NAND flash memory system of claim 9 being a SATA (serial advanced technology attachment) NAND flash disk system.

14. The dual channel NAND flash memory system of claim 9 being a solid-state-disk NAND flash disk system.

15. The dual channel NAND flash memory system of claim 9 being a PCI express NAND flash disk system.

16. The dual channel NAND flash memory system of claim 9 wherein the NAND flash memory controller, the first, the second and the third swap modules, can be disposed in a same chip.

17. A dual channel NAND flash memory system comprising:
　a NAND flash memory controller comprising:
　　a data interface for exchanging data, the data interface comprising a plurality of data ports;
　　a swap interface for transmitting a swap signal;
　　an chip enable interface, comprising a plurality of controller chip enable ports for transmitting a chip enable signal;
　　an action control interface, comprising a controller action port for transmitting action control signals; and
　　a status interface, comprising a controller status port for receiving status signals;
　a first NAND flash memory module comprising:
　　a data interface for exchanging data;
　　a chip enable interface coupled to one of the plurality of controller chip enable ports of the chip enable interface of the NAND flash memory controller for receiving the chip enable signal;
　　an action control interface coupled to the controller action port of the action control interface of the NAND flash memory controller for receiving the corresponding action control signal; and
　　a status interface coupled to the controller status port of the status interface of the NAND flash memory controller for transmitting the corresponding status signal;
　a second NAND flash memory module comprising:
　　a data interface for exchanging data ;
　　a chip enable interface coupled to the one of the plurality of controller chip enable ports of the chip enable interface of the NAND flash memory controller for receiving the chip enable signal;
　　an action control interface coupled to the controller action port of the action control interface of the NAND flash memory controller for receiving the corresponding action control signal; and
　　a status interface coupled to the controller status port of the status interface of the NAND flash memory controller for transmitting the corresponding status signal;
　a swap module comprising:
　　a control port coupled to the swap interface for receiving the swap signal;
　　a plurality of first ports, each of the first ports coupled to the corresponding port of the data interface of the NAND flash memory controller; and
　　wherein an amount of the plurality of the first ports of the swap module is as the same as an amount of the plurality of the data ports of the NAND flash memory controller;
　　a plurality of second ports, each of the second ports coupled to the data interface of the corresponding NAND flash memory module and selectively coupled to one of the first ports according to the swap signal, for the data interface of the NAND memory controller to exchange data with the data interface of the corresponding NAND flash memory module via the first ports and the second ports;
　　wherein an amount of the plurality of the second ports of the swap module is as the same as an amount of the plurality of the data ports of the NAND flash memory controller.

18. The dual channel NAND flash memory system of claim 17 wherein the memory controller transmits the swap signal according to condition of each of the first and the second NAND flash memory modules.

19. The dual channel NAND flash memory system of claim 17 being a USB NAND flash disk system.

20. The dual channel NAND flash memory system of claim 17 being a NAND flash memory card system.

21. The dual channel NAND flash memory system of claim 17 being a SATA (serial advanced technology attachment) NAND flash disk system.

22. The dual channel NAND flash memory system of claim 17 being a solid-state-disk NAND flash disk system.

23. The dual channel NAND flash memory system of claim 17 being a PCI express NAND flash disk system.

24. The dual channel NAND flash memory system of claim 17 wherein the NAND flash memory controller and the swap module, can be disposed in a same chip.

25. A dual channel NAND flash memory system comprising:
　a NAND flash memory controller comprising:
　　a data interface for exchanging data, the data interface comprising two data ports;
　　a swap interface for transmitting a swap signal;
　　a switch interface for transmitting a switch signal;
　　an chip enable interface for transmitting chip enable signals, the chip enable interface comprising two ports, each port transmitting a corresponding chip enable signal;
　　an action control interface for transmitting action control signals, the action control interface comprising two ports, each port transmitting a corresponding action control signal; and
　　a status interface for receiving status signals, the status interface comprising two ports, each port receiving a corresponding status signal;

four NAND flash memory modules, each NAND flash memory module comprising:
a data interface for exchanging data;
a chip enable interface for receiving the chip enable signal;
an action control interface for receiving the corresponding action control signal; and
a status interface for transmitting the corresponding status signal;
a first swap module comprising:
a control port coupled to the swap interface for receiving the swap signal;
two first ports, each of the first ports coupled to the corresponding port of the action control interface of the NAND flash memory controller for receiving the corresponding action control signal; and
two second ports, each of the second ports coupled to the action interfaces of the corresponding NAND flash memory modules and selectively coupled to one of the first ports according to the swap signal, for the corresponding action control signal received by the first ports to be transmitted to the action control interface of the corresponding NAND flash memory module;
a second swap module comprising:
a control port coupled to the swap interface for receiving the swap signal;
two first ports, each of the first ports coupled to the corresponding port of the status interface of the NAND flash memory controller for transmitting the corresponding status signal to the corresponding port of the status interface of the NAND flash memory controller; and
two second ports, each of the second ports coupled to the status interfaces of the corresponding NAND flash memory modules for receiving the corresponding status signal and selectively coupled to one of the first ports according to the swap signal, for the corresponding status signal received by the second ports to be transmitted to the corresponding port of the status interface of the NAND flash memory controller; and
a third swap module comprising:
a control port coupled to the swap interface for receiving the swap signal;
two first ports, each of the first ports coupled to the corresponding port of the data interface of the NAND flash memory controller; and
two second ports, each of the second ports coupled to the data interfaces of the corresponding NAND flash memory module and selectively coupled to one of the first ports according to the swap signal, for the data interface of the NAND memory controller to exchange data with the data interface of the corresponding NAND flash memory module via the first ports and the second ports; and
a remap module comprising:
a control port coupled to the switch interface for receiving the switch signal;
two first ports, each of the first ports coupled to the corresponding port of the chip enable interface of the NAND flash memory controller, for receiving the corresponding chip enable signal via the corresponding port of the chip enable interface of the corresponding NAND flash memory controller; and
two second ports, each of the second ports coupled to the chip enable interfaces of the corresponding NAND flash memory module and selectively coupled to one of the first ports according to the switch signal, for the corresponding chip enable signal received by the first ports to be transmitted to the corresponding chip enable interface of the corresponding NAND flash memory module.

26. The dual channel NAND flash memory system of claim 25 wherein the memory controller transmits the switch signal and swap signal according to condition of each of the NAND flash memory modules.

27. The dual channel NAND flash memory system of claim 25 being a USB NAND flash disk system.

28. The dual channel NAND flash memory system of claim 25 being a NAND flash memory card system.

29. The dual channel NAND flash memory system of claim 25 being a SATA (serial advanced technology attachment) NAND flash disk system.

30. The dual channel NAND flash memory system of claim 25 being a solid-state-disk NAND flash disk system.

31. The dual channel NAND flash memory system of claim 25 being a PCI express NAND flash disk system.

32. The dual channel NAND flash memory system of claim 25 wherein the NAND flash memory controller, the first swap module, the second swap module, the third swap module, and the remap module, can be disposed in a same chip.

33. A method for programming connections between a NAND flash memory controller and a plurality of NAND flash memory modules comprising:
the NAND flash memory controller generating a swap signal according to a condition of one of the plurality of NAND flash memory modules; and
a swap module selectively swapping connections between the plurality of NAND flash memory modules and the NAND flash memory controller according to the swap signal.

34. The method of claim 33 further comprising detecting the condition of the each of the plurality of NAND flash memory modules.

35. The method of claim 33 further comprising:
the NAND flash memory controller generating a switch signal according to a condition of one of the plurality of NAND flash memory modules; and
a remap module selectively coupling the plurality of NAND flash memory modules to the NAND flash memory controller according to the switch signal.

36. The method of claim 35 further comprising the remap module electrically uncoupling a first NAND flash memory module of the plurality of NAND flash memory modules from a first coupling to the NAND flash memory controller according to the switch signal.

37. The method of claim 36 wherein the first NAND flash memory module is identified by the switch signal.

38. The method of claim 36 further comprising the remap module switching an electrical connection of a second NAND flash memory module of the plurality of NAND flash memory modules from a second coupling to the NAND flash memory controller to the first coupling to the NAND flash memory controller.

39. The method of claim 38 wherein a sequential order of couplings between the NAND flash memory controller and the plurality of NAND flash memory modules remain constant.

40. The method of claim 35 wherein each NAND flash memory module comprises a chip-enabling pin and the remap module selectively alters electrical couplings of the chip-enable pins to the NAND flash memory controller according to the switch signal.

41. The method of claim 35 wherein each NAND flash memory module comprises a status pin and the swap module selectively alters electrical couplings of the status pins to the NAND flash memory controller according to the swap signal.

42. The method of claim 33 wherein each NAND flash memory module comprises a controlling pin and the swap module selectively alters electrical couplings of the controlling pins to the NAND flash memory controller according to the switch signal.

43. The method of claim 33 wherein each NAND flash memory module comprises a data pin and the swap module selectively alters electrical couplings of the data pins to the NAND flash memory controller according to the swap signal.

44. A method for programming connections between a NAND flash memory controller and a plurality of NAND flash memory modules comprising:
the NAND flash memory controller generating a switch signal according to a condition of one of the plurality of NAND flash memory modules; and
a remap module selectively coupling the plurality of NAND flash memory modules to the NAND flash memory controller according to the switch signal.

45. The method of claim 44 further comprising detecting the condition of the each of the plurality of NAND flash memory modules.

46. The method of claim 44 further comprising:
the NAND flash memory controller generating a swap signal according to a condition of one of the plurality of NAND flash memory modules; and
a swap module selectively swapping connections between the plurality of NAND flash memory modules and the NAND flash memory controller according to the swap signal.

47. The method of claim 46 wherein each NAND flash memory module comprises a data pin and the swap module selectively alters electrical couplings of the data pins to the NAND flash memory controller according to the swap signal.

48. The method of claim 44 further comprising the remap module electrically uncoupling a first NAND flash memory module of the plurality of NAND flash memory modules from a first coupling to the NAND flash memory controller according to the switch signal.

49. The method of claim 48 wherein the first NAND flash memory module is identified by the switch signal.

50. The method of claim 49 wherein a sequential order of couplings between the NAND flash memory controller and the plurality of NAND flash memory modules remain constant.

51. The method of claim 48 further comprising the remap module switching an electrical connection of a second NAND flash memory module of the plurality of NAND flash memory modules from a second coupling to the NAND flash memory controller to the first coupling to the NAND flash memory controller.

52. The method of claim 44 wherein each NAND flash memory module comprises a chip-enabling pin and the remap module selectively alters electrical couplings of the chip-enable pins to the NAND flash memory controller according to the switch signal.

53. The method of claim 44 wherein each NAND flash memory module comprises a status pin and the swap module selectively alters electrical couplings of the status pins to the NAND flash memory controller according to the swap signal.

54. The method of claim 44 wherein each NAND flash memory module comprises a controlling pin and the swap module selectively alters electrical couplings of the controlling pins to the NAND flash memory controller according to the switch signal.

55. A NAND flash memory system comprising:
a NAND flash memory controller comprising:
a data interface, comprising at least one controller data port for exchanging data;
a swap interface for transmitting swap signals;
a switch interface for transmitting switch signals;
an chip enable interface, comprising at least one controller chip enable port for transmitting at least one chip enable signal;
an action control interface, comprising at least one controller action port for transmitting at least one action control signal; and
a status interface, comprising at least one controller status port for receiving at least one status signal;
at least one NAND flash memory module, each NAND flash memory module comprising:
a data interface for exchanging data;
a chip enable interface for receiving a corresponding chip enable signal transmitted from the chip enable interface of the NAND flash memory controller;
an action control interface for receiving a corresponding action control signal transmitted from the action control interface of the NAND flash memory controller; and
a status interface for transmitting a corresponding status signal; and
an universal connection device coupled between the NAND flash memory controller and the NAND flash memory modules for coupling the NAND flash memory controller to the NAND flash memory modules according to the swap signals and switch signals;
wherein the universal connection device is coupled to the NAND flash memory controller and the NAND flash memory modules via a plurality of first ports and a plurality of second ports respectively for transmitting signals.

56. The NAND flash memory system of claim 55 being a USB NAND flash disk system.

57. The NAND flash memory system of claim 55 being a NAND flash memory card system.

58. The NAND flash memory system of claim 55 being a SATA (serial advanced technology attachment) NAND flash disk system.

59. The NAND flash memory system of claim 55 being a solid-state-disk NAND flash disk system.

60. The NAND flash memory system of claim 55 being a PCI express NAND flash disk system.

61. The NAND flash memory system of claim 55 wherein the NAND flash memory controller and the programmable configuration device can be disposed in a same chip.

* * * * *